(12) United States Patent
Yoon et al.

(10) Patent No.: US 12,456,520 B2
(45) Date of Patent: Oct. 28, 2025

(54) NON-VOLATILE MEMORY DEVICE, STORAGE DEVICE HAVING THE SAME AND OPERATING METHOD OF NON-VOLATILE MEMORY DEVICE

(71) Applicant: SAMSUNG ELECTRONICS CO., LTD., Suwon-si (KR)

(72) Inventors: Jayang Yoon, Suwon-si (KR); Chihyun Kim, Suwon-si (KR); Sangsoo Park, Suwon-si (KR); Junehong Park, Suwon-si (KR); Chiweon Yoon, Suwon-si (KR); Hyeongdo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 201 days.

(21) Appl. No.: 18/382,325

(22) Filed: Oct. 20, 2023

(65) Prior Publication Data
US 2024/0242765 A1    Jul. 18, 2024

(30) Foreign Application Priority Data
Jan. 12, 2023  (KR) .................. 10-2023-0004928

(51) Int. Cl.
| | |
|---|---|
| *G11C 11/34* | (2006.01) |
| *G11C 16/08* | (2006.01) |
| *G11C 16/10* | (2006.01) |
| *G11C 16/30* | (2006.01) |

(52) U.S. Cl.
CPC ............ *G11C 16/102* (2013.01); *G11C 16/08* (2013.01); *G11C 16/30* (2013.01)

(58) Field of Classification Search
CPC ........... G11C 16/10; G11C 16/30; G11C 1/12; G11C 16/0483; H01L 27/115
USPC ...................................... 365/185.18, 189.16
See application file for complete search history.

(56) References Cited

U.S. PATENT DOCUMENTS

| | | | |
|---|---|---|---|
| 7,050,339 B2 | 5/2006 | Tanzawa | |
| 7,639,540 B2 | 12/2009 | Kim et al. | |
| 8,902,678 B2 * | 12/2014 | Dimartino | ............... G05F 1/575 |
| | | | 365/230.06 |
| 9,543,032 B2 | 1/2017 | Kang et al. | |
| 9,576,675 B2 | 2/2017 | Kim et al. | |

(Continued)

OTHER PUBLICATIONS

Communication dated Mar. 26, 2024, issued by the European Patent Office in counterpart European Application No. 23203033.8.

*Primary Examiner* — Son T Dinh
(74) *Attorney, Agent, or Firm* — Sughrue Mion, PLLC

(57) ABSTRACT

A non-volatile memory device includes a memory cell array including memory cells coupled to word lines, a boost circuit that receives an external power supply voltage and generate a boosted voltage based on the external power supply voltage, a regulator that generates a regulated voltage based on the external power supply voltage, and a control logic that controls word line voltages provided to the word lines. The control logic performs plural program loops in a program operation for the memory cell array. The control logic provides an adjacent word line voltage to an adjacent word line that is adjacent to a selected word line. In a first section of the program loops, the control logic provides the regulated voltage as the adjacent word line voltage, and in a second section of the program loops, the control logic provides the boosted voltage as the adjacent word line voltage.

20 Claims, 20 Drawing Sheets

(56) References Cited

U.S. PATENT DOCUMENTS

| | | |
|---|---|---|
| 10,553,267 B2 | 2/2020 | Koo |
| 11,049,574 B2 | 6/2021 | Kim et al. |
| 11,120,877 B2 | 9/2021 | Okabe |
| 11,227,664 B2 | 1/2022 | Cho |
| 2017/0076800 A1* | 3/2017 | Musha ............... G11C 16/0483 |
| 2019/0066793 A1 | 2/2019 | Shin et al. |
| 2019/0088663 A1 | 3/2019 | Shikata et al. |
| 2022/0101923 A1 | 3/2022 | Park et al. |
| 2022/0157393 A1 | 5/2022 | Park et al. |

* cited by examiner (a)

(b)

(a)

(b)

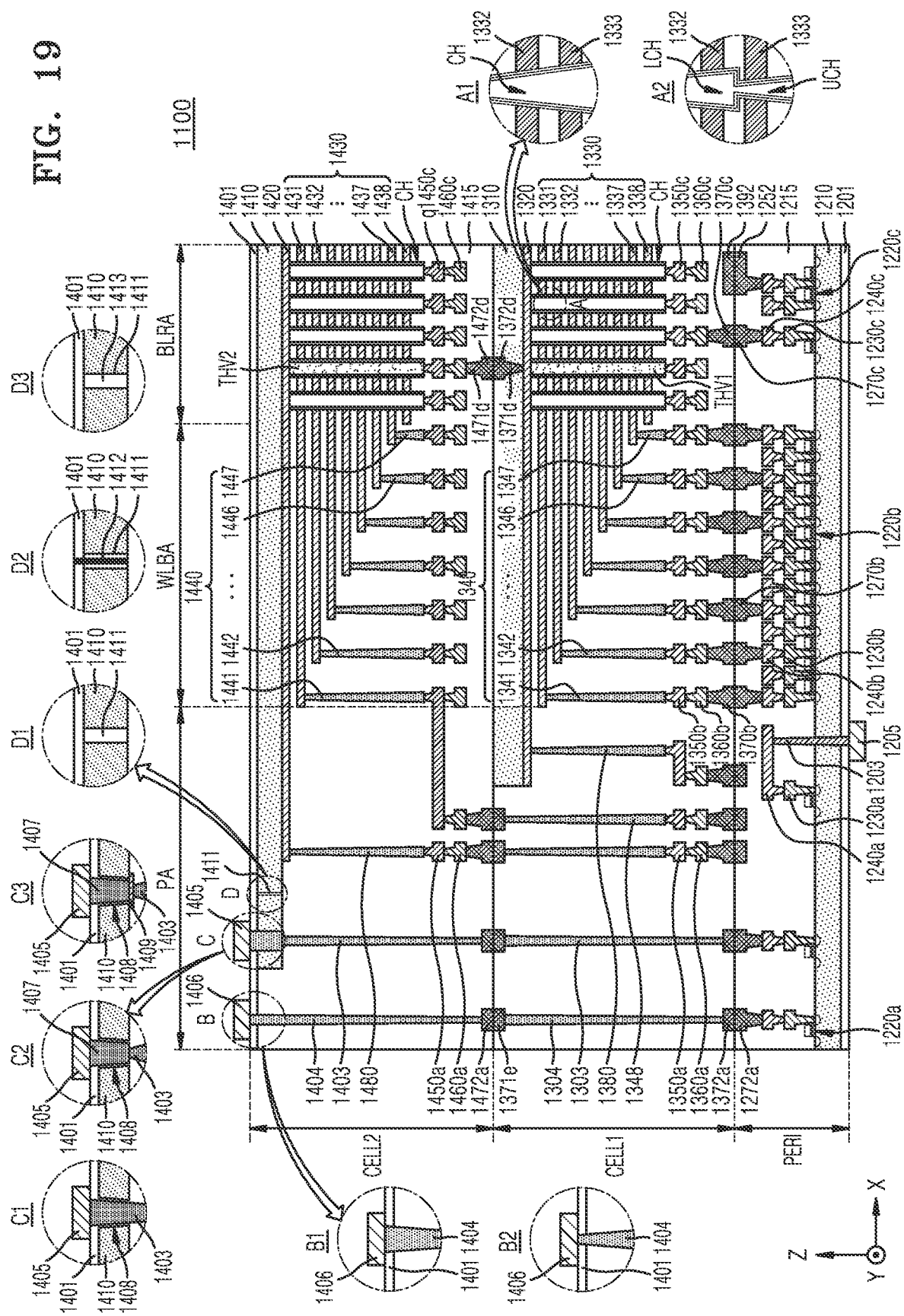

(1)

NON-VOLATILE MEMORY DEVICE, STORAGE DEVICE HAVING THE SAME AND OPERATING METHOD OF NON-VOLATILE MEMORY DEVICE

CROSS-REFERENCE TO RELATED APPLICATION

This application is based on and claims priority under 35 U.S.C. § 119 to Korean Patent Application No. 10-2023-0004928, filed on Jan. 12, 2023, in the Korean Intellectual Property Office, the disclosure of which being incorporated by reference herein in its entirety.

BACKGROUND

The present disclosure relates to a non-volatile memory device, and more particularly, to a non-volatile memory device receiving a high voltage from the outside, a storage device including the same, and a method of operating the non-volatile memory device.

As a non-volatile memory, a flash memory may retain stored data even when power thereto is cut off. Storage devices including flash memories, such as solid state disks (SSDs) and memory cards, are widely used, and storage devices are used to store or move large amounts of data.

SUMMARY

It is an aspect to provide a non-volatile memory device capable of improving characteristics in terms of power consumption and efficiency by optimizing the generation and transmission of word line voltages provided to word lines, and a storage device including the same, and a method of operating the non-volatile memory device.

According to an aspect of one or more embodiments, there is provided a non-volatile memory device comprising a memory cell array including memory cells coupled to a plurality of word lines; a boost circuit configured to receive an external power supply voltage and generate a boosted voltage based on the external power supply voltage; a regulator configured to generate a regulated voltage based on the external power supply voltage; and a control logic configured to control word line voltages provided to the plurality of word lines, wherein the control logic performs a plurality of program loops in a program operation for the memory cell array, and wherein the control logic provides an adjacent word line voltage to at least one adjacent word line that is adjacent to a selected word line, and wherein, in a first section of the plurality of program loops, the control logic provides the regulated voltage as the adjacent word line voltage, and in a second section of the plurality of program loops, the control logic provides the boosted voltage as the adjacent word line voltage.

According to another aspect of one or more embodiments, there is provided a method of operating a non-volatile memory device, in which a program operation of the non-volatile memory device comprises a plurality of program loops, the method comprises providing a first boosted voltage generated by boosting an external power supply voltage to a selected word line; providing a first regulated voltage generated by regulating the external power supply voltage to a non-selected word line; providing a second regulated voltage generated by regulating the external power supply voltage to at least one adjacent word line that is adjacent to the selected word line in initial loops of the plurality of program loops; and providing a second boosted voltage generated by boosting the external power supply voltage to the at least one adjacent word line in subsequent loops after the initial loops are performed.

According to another aspect of one or more embodiments, there is provided a storage device comprising a non-volatile memory having a memory cell array including memory cells connected to a plurality of word lines; a controller configured to control a memory operation of the non-volatile memory; and a power management integrated circuit (PMIC) configured to provide a high voltage to the non-volatile memory, wherein the non-volatile memory comprises a regulator configured to provide a first adjacent word line voltage that is generated by regulating the high voltage to at least one adjacent word line that is adjacent to a selected word line, in initial loops of a plurality of program loops included in a program operation; and a boost circuit configured to provide a second adjacent word line voltage that is generated by boosting the high voltage to the at least one adjacent word line in subsequent loops among the plurality of program loops that are subsequent to the initial loops.

BRIEF DESCRIPTION OF THE DRAWINGS

Various embodiments will be more clearly understood from the following detailed description taken in conjunction with the accompanying drawings, in which:

FIG. 19 is a cross-sectional view of a memory device having a B-VNAND structure, according to some example embodiments.

DETAILED DESCRIPTION

A plurality of program loops may be performed in writing data to a non-volatile memory device. In a plurality of program loops, an incremental step pulse programming (ISPP) voltage having a relatively high level and a level that gradually increases as the loops progress may be provided to a selected word line, and in this case, interference may occur in a word line adjacent to the selected word line (e.g., an adjacent word line).

In addition, word line voltages of various levels may be provided to word lines of a non-volatile memory device in memory operations, such as a program operation and a read operation, and in addition, the non-volatile memory device may receive a high voltage provided from an external device (e.g., a power management integrated circuit (PMIC)) and generate a word line voltage through a level adjustment operation for the received high voltage. At this time, it is necessary to improve the characteristics degradation in terms of power consumption and efficiency in the process of adjusting the voltage level.

Hereinafter, various some example embodiments will be described in detail with reference to the accompanying drawings.

Figure 1:
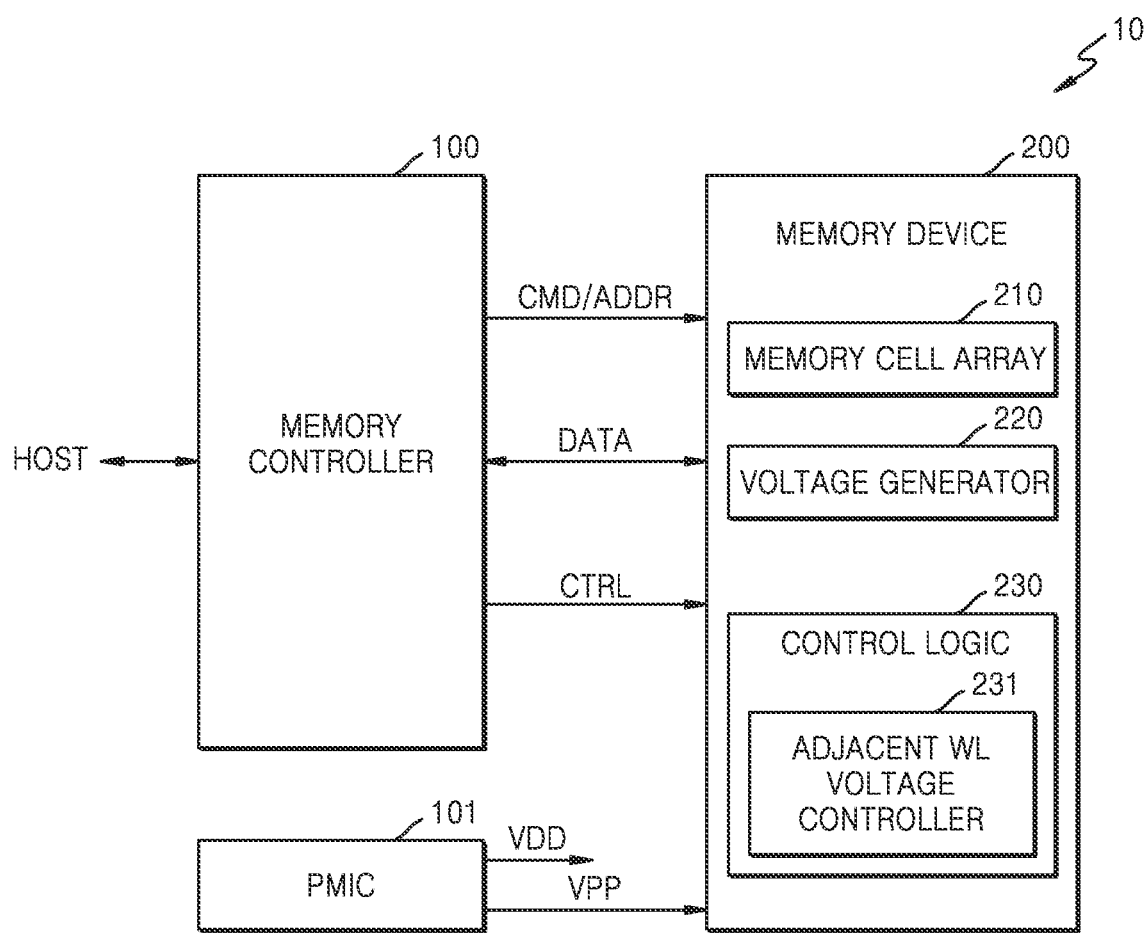
FIG. 1 is a block diagram illustrating a memory system, according to some example embodiments.

FIG. 1 is a block diagram illustrating a memory system according to some example embodiments.

Referring to FIG. 1, a memory system 10 may include a memory controller 100 and a non-volatile memory device 200 (hereinafter, referred to as a memory device), and the memory device 200 may include a memory cell array 210, a voltage generator 220, and a control logic 230, and the control logic 230 may include an adjacent word line (WL) voltage controller 231. In the example of FIG. 1, the adjacent word line voltage controller 231 is shown as being included in the control logic 230. However, the adjacent word line voltage controller 231 according to some example embodiments may be implemented as a separate component outside the control logic 230. In some example embodiments, the adjacent word line voltage controller 231 may perform functions according to various example some example embodiments through various methods, and as an example, the adjacent word line voltage controller 231 may be implemented as a hardware circuit, software executable by a processor, or a combination thereof.

According to some example embodiments, the memory system 10 may communicate with a host HOST through various interfaces. For example, the memory system 10 may communicate with the host HOST through various interfaces, such as Universal Serial Bus (USB), multimedia card (MMC), embedded MMC (eMMC), peripheral component interconnection (PCI), PCI-express (PCI-E), Advanced Technology Attachment (ATA), Serial-ATA, Parallel-ATA, small computer small interface (SCSI), enhanced small disk interface (ESDI), Integrated Drive Electronics (IDE), Firewire, Universal Flash Storage (UFS), Non-volatile Memory express (NVMe), and the like.

According to some example embodiments, the memory device 200 may include a non-volatile memory device. In some example embodiments, the memory system 10 may be implemented as an embedded or removable memory in an electronic device, and for example, the memory system 10 may be implemented in various forms, such as an Embedded Universal Flash Storage (UFS) memory device, an embedded Multi-Media Card (eMMC), a Solid State Drive (SSD), a UFS memory card, a Compact Flash (CF) card, a Secure Digital (SD) card, a Micro Secure Digital (Micro-SD) card, a Mini Secure Digital (Mini-SD) card, an extreme Digital (xD) card, or a memory stick.

The memory controller 100 may control the memory device 200 to read data stored in the memory device 200 or write (or program) data to the memory device 200 based on a read/write request from the host HOST. Specifically, the memory controller 100 may control program, read, and erase operations of the memory device 200 by providing an address ADDR, a command CMD, and a control signal CTRL to the memory device 200. In some example embodiments, data DATA to be stored in the memory device 200 and data DATA read from the memory device 200 may be transmitted and received between the memory controller 100 and the memory device 200.

The memory cell array 210 may include a plurality of memory cells, and for example, the plurality of memory cells may be flash memory cells. Hereinafter, some example embodiments will be described in detail by taking a case where a plurality of memory cells are NAND flash memory cells as an example. However, example embodiments are not limited thereto, and in some example embodiments, the plurality of memory cells may be resistive memory cells having resistance distributions, such as resistive RAM (Re-RAM), phase change RAM (PRAM), or magnetic RAM (MRAM).

In some example embodiments, the memory cell array 210 may include a three-dimensional memory cell array, and the three-dimensional memory cell array may include a plurality of NAND strings, and each NAND string may include memory cells respectively connected to word lines vertically stacked on a substrate. U.S. Pat. Nos. 7,679,133, 8,553,466, 8,654,587, 8,559,235, and U.S. Patent Application Publication No. 2011/0233648, herein incorporated by reference in their entireties, disclose in detail suitable configurations of a three-dimensional memory array in which a three-dimensional memory array is configured in multiple levels and word lines and/or bit lines are shared between the levels. However, example embodiments are not limited thereto, and in some example embodiments, the memory cell array 210 may include a two-dimensional memory cell array, and the two-dimensional memory cell array may include a plurality of NAND strings arranged in row and column directions.

The memory device 200 receives a high voltage VPP as an external power supply voltage from a power management IC (PMIC) 101, and the memory device 200 may perform various processing operations using the high voltage VPP provided from the PMIC 101. The PMIC 101 may further output at least one power supply voltage VDD together with the high voltage VPP, and the power supply voltage VDD may be provided to the memory device 200. In some example embodiments, the power supply voltage VDD may have a lower level than the high voltage VPP, and as an example, the power supply voltage VDD may be used in peripheral circuits including various circuits related to driving the memory cell array 210, and the high voltage VPP may be used in circuit configurations within the memory cell array 210.

The memory device 200 may include a terminal (not shown) that receives the high voltage VPP, and may perform a voltage processing operation on the high voltage VPP received through the terminal. As an example, a word line voltage having a higher level than the high voltage VPP may be generated by boosting the high voltage VPP, and a word line voltage having a lower level than the high voltage VPP may be generated through a regulating process for the high voltage VPP. In some example embodiments, the boosting process and/or the regulating process described above may be performed by the voltage generator 220. some example embodiments, circuit components that perform voltage boosting processing and/or regulating processing may be provided outside the voltage generator 220, and the high voltage VPP may be provided directly to the circuit components, or the high voltage VPP may be provided to the circuit components through the voltage generator 220.

In some example embodiments, a boost circuit that performs boost processing may include a voltage pump that generates a word line voltage having a level higher than the high voltage VPP. In some example embodiments, the boost circuit may further include a regulator for adjusting or maintaining the level of the word line voltage at a target level. In some example embodiments, the boost circuit may include a voltage pump, may include a voltage pump and a regulator together, or may include a circuit configuration that performs the function of a regulator together with a pumping circuit, and the like. However, example embodiments are not limited thereto, and a boost circuit according to some example embodiments may be defined in various ways.

In some example embodiments, the memory system 10 may include the memory controller 100 and the memory device 200, and the PMIC 101 may be defined as a separate component from the memory system 10. In some example embodiments, the memory system 10 may be defined as further including the PMIC 101 together with the memory controller 100 and the memory device 200.

When a write command is provided from the memory controller 100 to the memory device 200, a program operation may be performed under the control of the control logic 230. A program operation may include multiple program loops, and to change (or increase) the threshold voltage level of memory cells connected to the selected word line in each program loop, a program operation using a program voltage (or selected word line voltage) and a verify operation using a verify voltage to determine whether a program passes/fails may be performed. In some example embodiments, when the program operation is performed using an incremental step pulse programming (ISPP) method, voltage pulses of which the level gradually increases each time program loops are performed may be provided as the program voltage.

During a program operation, a non-selected word line voltage (e.g., pass voltage) having a preset level may be provided to the non-selected word line. In some example embodiments, a verify operation may be performed in at least some of the plurality of program loops, and for example, in a verify operation, a verify voltage may be provided to a selected word line, and a verify pass voltage having a preset level may be provided to a non-selected word line.

Since a program voltage having a high level is provided to the selected word line during a program operation, interference may occur in which a threshold voltage level of memory cells connected to at least one word line adjacent to the selected word line varies. According to some example embodiments, to reduce or eliminate interference generated on an adjacent word line in a process of performing multiple program loops, a level control operation may be performed to increase the level of the word line voltage provided to the adjacent word line at least once.

Assuming that the boost circuit and the regulator are included in the voltage generator 220, the voltage generator 220 may generate voltages provided to a plurality of word lines by performing a voltage processing operation using the high voltage VPP. The control logic 230 may control the overall operation of the memory device 200, and as an example, based on the command CMD, the address ADDR, and the control signal CTRL received from the memory controller 100, the control logic 230 may output various internal control signals for programming data into the memory cell array 210 or reading data from the memory cell array 210. In some example embodiments, the control logic 230 may output a voltage control signal (not shown) for adjusting the levels of various voltages output from the voltage generator 220 in relation to the program operation, the read operation, and the erase operation.

According to some example embodiments, the level of the high voltage VPP provided to the memory device 200 may have a level related to a program voltage used in a program operation and an adjacent word line voltage. As an example, when the level of the high voltage VPP provided from the outside is excessively high, power consumption may increase while the memory device 200 processes the high voltage VPP, and when the level of the memory device 200 is reduced through a regulating process for the high voltage VPP, the voltage efficiency may be greatly reduced.

As described above, in the process of performing a plurality of program loops, the level of an adjacent word line voltage may be increased stepwise at least once. In some example embodiments, the level of the adjacent word line voltage may gradually increase corresponding to the gradual increase of the program voltage level according to the ISPP scheme. According to some example embodiments, the level of the high voltage VPP may be a level corresponding to a minimum value and a maximum value of adjacent word line voltage levels in a program operation. In some example embodiments, the level of the high voltage VPP may be a level that is less than a minimum value of the program voltage level.

The adjacent word line (WL) voltage controller 231 of the control logic 230 may control a voltage provided to at least one adjacent word line that is adjacent to the selected word line. As an example, the adjacent word line voltage controller 231 may control the level of the adjacent word line voltage provided to the adjacent word lines, and may determine the timing at which the adjacent word line voltage level changes or increases. The timing determination operation may be implemented in various ways, and as an example, an adjacent word line voltage level may increase at execution timing of one or more loops among a plurality of program loops. For example, the adjacent word line voltage controller 231 may compare the value obtained by counting the number of loops with a reference value, and determine the level change timing of the adjacent word line voltage based on the comparison result. The reference range may be preset.

In some example embodiments, the adjacent word line voltage controller 231 may perform a decision operation based on a result of detecting the voltage and/or current level. In some example embodiments, the voltage generator 220 may receive a preset control code and adjust the voltage level provided to the word lines based on the received control code, and as an example, the preset control code may be provided by the control logic 230. The adjacent word line voltage controller 231 may receive the preset control code and may determine the level change timing of the adjacent word line voltage depending on whether the value of the control code corresponds to a value that controls the level of the program voltage and/or the adjacent word line voltage to exceed a reference value. The reference value may be preset.

According to some example embodiments, the adjacent word line voltage controller 231 of the control logic 230 may control a path of a voltage provided to an adjacent word line. As an example, based on control of the control logic 230, the boosted voltage of which the level has risen through boost processing for the high voltage VPP is provided to an adjacent word line, or through the regulating process for the high voltage VPP, a regulating voltage having the same level or a reduced level may be provided to an adjacent word line. In some example embodiments, the level of the adjacent word line voltage may gradually increase as the program loops are performed, and when the level of the adjacent word line voltage is relatively low, the regulating voltage may be provided to the adjacent word line. Thereafter, as the level of the adjacent word line voltage gradually increases, the boosted voltage may be provided to the adjacent word line.

According to some example embodiments, since the level of the high voltage VPP provided from the outside may be lower than the program voltage level or based on the adjacent/non-selected word line voltage level, power consumed in the voltage processing operation may be reduced. When the level of the high voltage VPP is higher than the program voltage level, although power loss increases in early program loops in which a relatively low level voltage is used, the power loss may be reduced.

Figure 2:
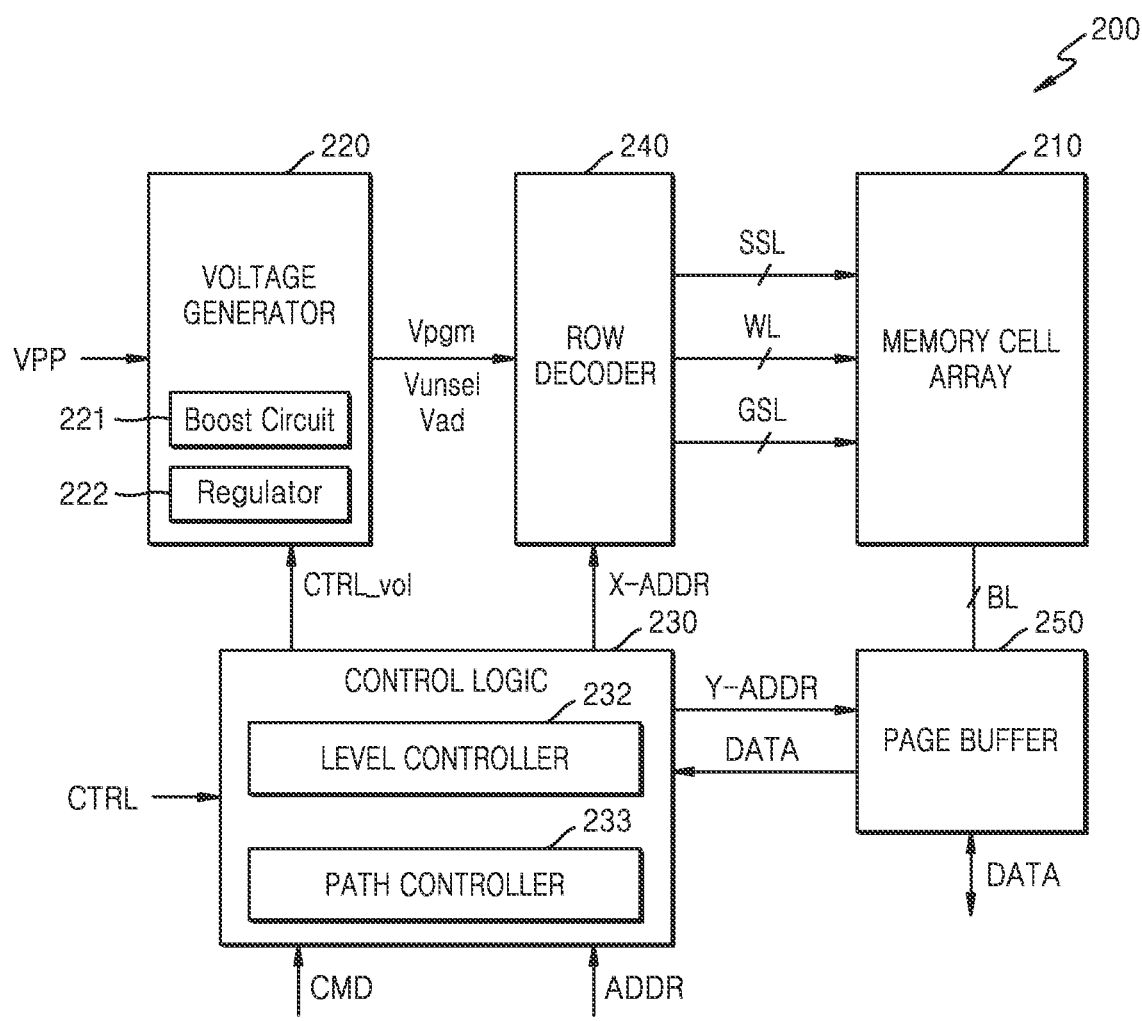
FIG. 2 is a block diagram illustrating an implementation example of a memory device of the memory system of FIG. 1, according to some example embodiments.

FIG. 2 is a block diagram illustrating an implementation example of the memory device 200 of FIG. 1.

Referring to FIGS. 1 and 2, a memory device 200 may include a memory cell array 210, a voltage generator 220, a control logic 230, a row decoder 240, and a page buffer 250. In some example embodiments, the control logic 230 may include a level controller 232 and a path controller 233. Although not shown in FIG. 2, the memory device 200 may further include various other components related to memory operation, such as a data input/output circuit or an input/output interface.

The memory cell array 210 includes a plurality of memory blocks and may be connected to word lines WL, string select lines SSL, ground select lines GSL, and bit lines BL. The memory cell array 210 may be connected to the row decoder 240 through the word lines WL, the string select lines SSL, and the ground select lines GSL, and may be connected to the page buffer 250 through the bit lines BL. Each memory cell may store one or more bits, and as an example, the memory cell may correspond to a multi-level cell (MLC), a triple-level cell (TLC), or a quad-level cell (QLC).

The control logic 230 may output various internal control signals for programming data into the memory cell array 210 or reading data from the memory cell array 210 based on the command CMD, the address ADDR, and the control signal CTRL received from the memory controller 100. The control logic 230 may output a voltage control signal CTRL_vol for controlling the level of various voltages generated by the voltage generator 220. In some example embodiments, as illustrated in FIG. 2, the level controller 232 and the path controller 233 may be included in the control logic 230. However, some example embodiments are not limited thereto, and in some example embodiments, at least one of the elements constituting the level controller 232 and the path controller 233 may be provided outside the control logic 230.

The control logic 230 may provide the row address X-ADDR to the row decoder 240 and may provide the column address Y-ADDR to the page buffer 250. During a program/read operation, the row decoder 240 may provide various word line voltages in response to the row address X-ADDR. As an example, in relation to a program operation, the row decoder 240 may provide a program voltage Vpgm to a selected word line. In some example embodiments, the row decoder 240 may provide the adjacent word line voltage Vad to one or more adjacent word lines and may provide the non-selected word line voltage Vunsel to the remaining non-selected word lines. The page buffer 250 may operate as a write driver or a sense amplifier according to an operation mode. The page buffer 250 may include a plurality of buffer units respectively connected to a plurality of bit lines BL.

The voltage generator 220 may perform a voltage processing operation using a high voltage VPP provided from an external device (e.g., a PMIC), and may include, for example, a boost circuit 221 and a regulator 222. In some example embodiments, the boost circuit 221 may include a voltage pump. In some example embodiments, a regulator separate from the regulator 222 for adjusting the level of the boosted voltage to a target level may be further included in the boost circuit 221. In some example embodiments, the regulator 222 may include a circuit configuration, such as a linear regulator or low dropout (LDO).

According to some example embodiments, an adjacent word line voltage level may be increased at least once in a process of performing a plurality of program loops. For example, as the level of the program voltage Vpgm increases based on the ISPP scheme, the level of an adjacent word line voltage may also increase corresponding to the level increase of the program voltage Vpgm. In some example embodiments, the adjacent word line voltage level may increase stepwise when the level of the program voltage Vpgm rises above a reference value. The reference value may be preset.

In some example embodiments, the adjacent word line voltage level may gradually rise while program loops are performed, and the level of the high voltage VPP may be a level between a minimum value and a maximum value of the adjacent word line voltage level. In a first section including one or more initial loops among the program loops, an adjacent word line voltage level may be relatively low, and during the first section, the regulating voltage generated by the regulator 222 may be provided to an adjacent word line through the row decoder 240. In a second section including one or more loops performed after the first section, an adjacent word line voltage level may be relatively high, and during the second section, the boosted voltage generated by the boost circuit 221 may be provided to the selected word line through the row decoder 240. In some example embodiments, the second section may start at a timing when the level of the adjacent word line voltage becomes higher than the high voltage VPP.

In some example embodiments, the level controller 232 may determine the timing at which the level of an adjacent word line voltage varies according to information in the control logic 230, and may perform control operations such that the level of an adjacent word line voltage is adjusted.

The information may be preset in the control logic 230. As an example, the level controller 232 may control the operation of the boost circuit 221 and the regulator 222.

According to some example embodiments, the voltage provided to the adjacent word line may be changed from a regulating voltage to a boosted voltage, and the path controller 233 may perform a control operation so that a transfer path of a voltage signal provided to an adjacent word line changes from a regulating voltage to a boosted voltage. According to some example embodiments, the path control timing may be determined through various methods, and as an example, the path control timing may be determined based on counting the number of executions of program loops, detecting the level of voltage or current provided to the selected word line and/or the adjacent word lines, or determining a control code for adjusting the level of the voltage provided to the selected word line and/or the adjacent word line.

In some example embodiments, the feature of providing a boosted voltage as an adjacent word line voltage may define operations in a variety of ways. For example, a voltage having a preset target level may be provided to an adjacent word line, and a boosted voltage for which regulating processing is performed as a preset target level may refer to the boosted voltage. In some example embodiments, the memory device 200 may include components for regulating the boosted voltage in various ways, and as an example, the boost circuit 221 may include an additional regulator. In some example embodiments, the boosted voltage may be provided to the regulator 222, and the regulator 222 may generate an adjacent word line voltage based on the boosted voltage. In some example embodiments, a regulator may be further provided separately from the configuration shown in FIG. 2, and the regulating process for the boosted voltage may be performed by the separate regulator. That is, in some example embodiments, providing a boosted voltage to an adjacent word line may define that a voltage generated based on the boosted voltage from the boost circuit 221 is provided to an adjacent word line. In some example embodiments, at least one of the level controller 232 and the path controller 233 may be included in the adjacent word line voltage controller 231 shown in FIG. 1.

Figure 3:
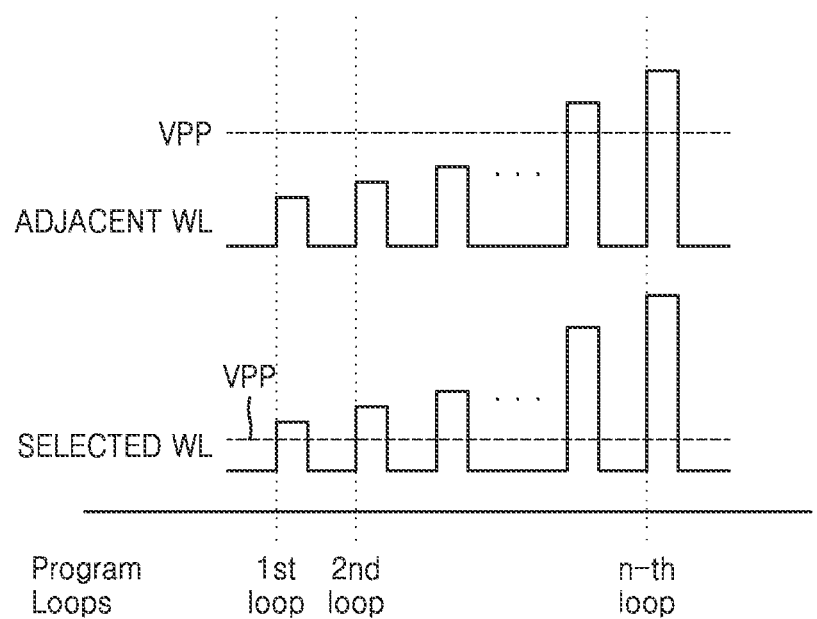
FIG. 3 is a diagram illustrating an example of voltage pulses provided to a selected word line and an adjacent word line in a process of performing program loops, according to some example embodiments.

FIG. 3 is a diagram illustrating an example of voltage pulses provided to a selected word line and an adjacent word line in a process of performing program loops, according to some example embodiments.

Referring to FIGS. 1 to 3, a program operation may be performed based on the ISPP method, and accordingly, a program voltage level provided to a selected word line may gradually increase whenever program loops are performed. Although not shown in FIG. 3, the selected word line may further receive a verify voltage for determining whether the program passes/fails in each program loop.

According to some example embodiments, to reduce or eliminate interference in at least one adjacent word line adjacent to the selected word line, a gradually increasing adjacent word line voltage may be provided to the adjacent word line whenever program loops are performed. In the example shown in FIG. 3, the case in which the level of the adjacent word line voltage increases together whenever the level of the program voltage increases is exemplified, but the some example embodiments are not limited thereto. As an example, at least one reference value related to a level change of an adjacent word line voltage may be set, and whenever the level of the program voltage exceeds the reference value, the level of the adjacent word line voltage may be increased.

The high voltage VPP supplied from the outside may have an appropriate level so that excessive power consumption does not occur in the memory device 200. For example, in the case of providing only a regulating voltage for an adjacent word line, it is advantageous for the high voltage VPP provided from the outside to have a level higher than the maximum value of the voltage level provided to the adjacent word line in the program loops. According to some example embodiments, the level of the high voltage VPP may be a level between a minimum value and a maximum value of the level of a voltage signal provided to an adjacent word line.

Under the control of the control logic 230, a path of a voltage signal provided to an adjacent word line may be changed, and for example, in a first section including initial loops among program loops, a regulating voltage having a relatively low level and provided from the regulator 222 may be provided to an adjacent word line. On the other hand, in the second section including the latter loops among the program loops performed after the initial loops, a boosted voltage having a relatively high level and provided from the boost circuit 221 may be provided to an adjacent word line.

In the example shown in FIG. 3, the case in which the high voltage VPP level is lower than the minimum value of the program voltage is exemplified, but the some example embodiments are not limited thereto. As an example, in at least one initial loop, the program voltage may have a lower level than the high voltage VPP, and a regulating voltage lowering the level of the high voltage VPP in the initial loop may be provided to the selected word line.

Figure 4:
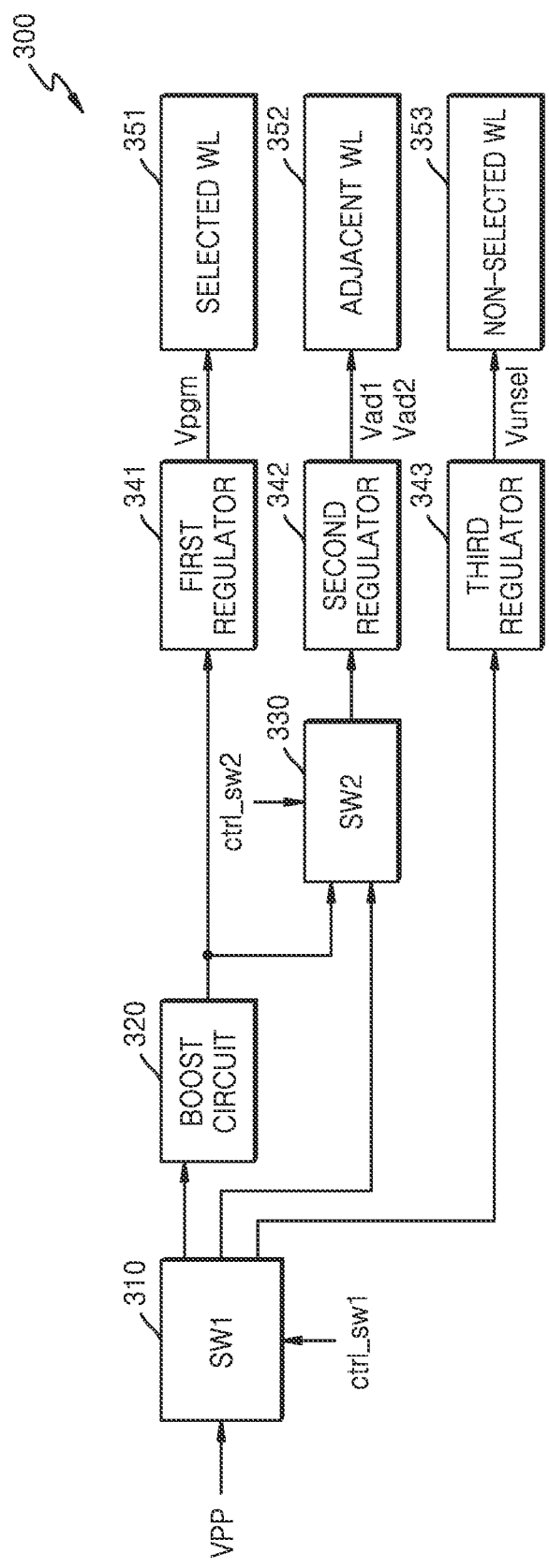
FIG. 4 is a block diagram illustrating an implementation example of a memory device according to some example embodiments.

FIG. 4 is a block diagram illustrating an implementation example of a memory device according to some example embodiments.

Referring to FIG. 4, a memory device 300 may include a first switch (SW1) 310, a boost circuit 320, a second switch (SW2) 330, a plurality of regulators, e.g., a first regulator 341, a second regulator 342, and a third regulator 343, and a plurality of word lines. For example, in a memory operation, such as program/read, a plurality of word lines may include a selected word line 351, at least one adjacent word line 352, and a plurality of non-selected word lines 353. In some example embodiments, the boost circuit 320 may include a voltage pump. The first to third regulators 341 to 343 are exemplified and hereinafter referred to as a plurality of regulators 341 to 343. In some example embodiments, each of the plurality of regulators 341 to 343 may include an LDO.

The first switch (SW1) 310 may be disposed on a path that receives the high voltage VPP provided from an external PMIC and transmits the high voltage VPP inside the memory device 300. In some example embodiments, during various operations of the memory device 300, the high voltage VPP may be provided to the boost circuit 320 and/or the regulators 341 to 343 through the first switch 310. For example, in the case of an operation in which only a voltage of a lower level than the high voltage VPP is used, the high voltage VPP may be selectively provided to at least one of the regulators 341 to 343 based on the switching operation of the first switch 310 in response to the first switch control signal Ctrl_sw1. When a voltage higher than the high voltage VPP is used in a certain operation, based on the switching operation of the first switch 310, the high voltage VPP may be provided to the boost circuit 320 or may be provided together with at least one of the boost circuit 320 and the first to third regulators 341 to 343.

In performing program loops, a program voltage higher than the high voltage VPP may be provided to the selected word line 351, and a boosted voltage from the boost circuit 320 may be provided to the selected word line 351 as a program voltage Vpgm. As an example, the boosted voltage from the boost circuit 320 may be provided to the selected word line 351 as a program voltage Vpgm having a preset target level through the first regulator 341.

In some example embodiments, in performing program loops, a non-selected word line voltage Vunsel of a lower level than the high voltage VPP may be provided to the non-selected word line 353, and the regulating voltage from the third regulator 343 may be provided to the plurality of non-selected word line 353 as the non-selected word line voltage Vunsel.

According to some example embodiments, the level of the adjacent word line voltage provided to at least one adjacent word line 352 may vary, and the second switch (SW2) 330 may control a transfer path of a voltage signal provided to at least one adjacent word line 352.

As an example, the switching of the second switch (SW2) 330 may be controlled in response to the second switch control signal Ctrl_sw, and receive the high voltage VPP from the first switch 310 and the boosted voltage from the boost circuit 320. In some example embodiments, the second switch 340 may output the high voltage VPP from the first switch 310 in the first section, and output a boosted voltage from the boost circuit 320 in the second section.

The second regulator 342 may generate and provide the first adjacent word line voltage Vad1 and the second adjacent word line voltage Vad2 to at least one adjacent word line 352. For example, in some of the initial loops of the program loops, the second regulator 342 may regulate the high voltage VPP from the first switch 310 and provide the first adjacent word line voltage Vad1 to at least one adjacent word line 352. In some example embodiments, in some of the later loops among the program loops after the initial loops, the second regulator 342 may regulate the boosted voltage from the boost circuit 320 and provide the second adjacent word line voltage Vad2 to at least one adjacent word line 352.

Figure 5:
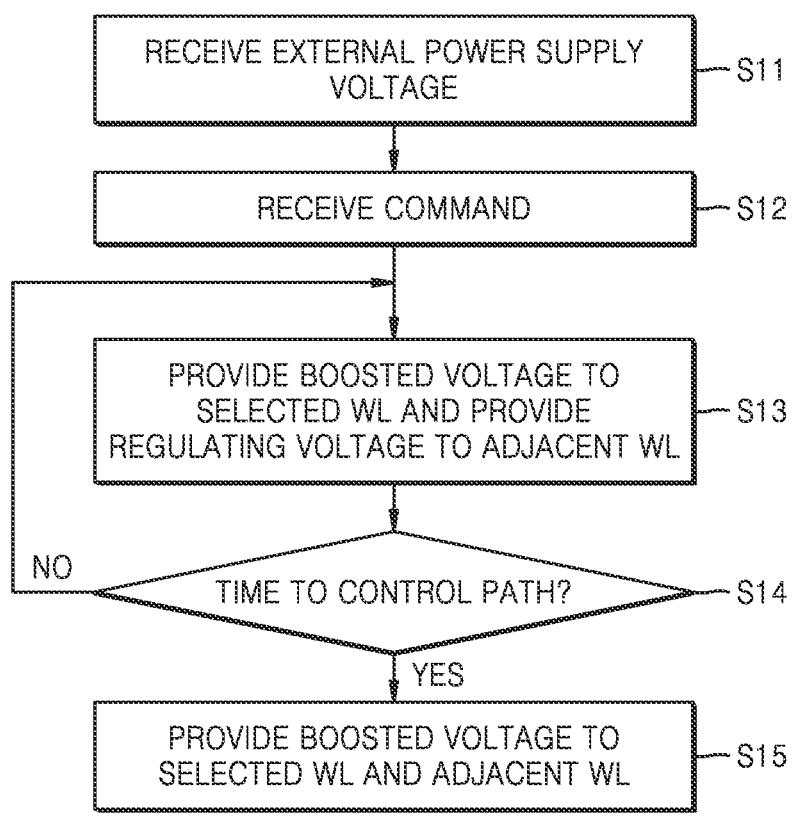
FIG. 5 is a flowchart illustrating a method of operating a memory device, according to some example embodiments.

FIG. 5 is a flowchart illustrating a method of operating a memory device, according to some example embodiments.

Referring to FIG. 5, in operation S11, the memory device may receive at least one external power supply voltage through an external terminal, and as an example, may receive a high voltage VPP used to generate an internal voltage having a high level, such as a program voltage.

In operation S12 the memory device may receive various types of commands from an external host or memory controller, and may receive a write command as an example. The memory device may receive multiple program loops in response to the write command, and a program voltage of which the level gradually increases may be provided to the selected word line in the course of performing a plurality of program loops, and in some example embodiments, an adjacent word line voltage of which the level increases at least once may be provided to at least one adjacent word line adjacent to the selected word line.

In operation S13, the memory device may provide a boosted voltage to a selected word line and may provide a regulating voltage to an adjacent word line. For example, the memory device may provide a boosted voltage generated through a boosting process using a voltage pump for the high voltage VPP to a selected word line, and may provide a regulating voltage obtained by reducing the level of the high voltage VPP to an adjacent word line.

In operation S14, the memory device may determine whether it is time to control a path. For example, the memory device may determine whether it is time to control a path of a voltage signal provided to an adjacent word line in the course of performing program loops, and the determination operation may be based on various pieces of information set based on the level of an adjacent word line voltage. Information related to path control timing may be set according to various methods, and considering various factors, such as power consumption and voltage processing efficiency. Information that the circuit configuration for providing the adjacent word line voltage is changed to the boost circuit at the optimal timing may be set. In operation S14, if it is determine that it is not time to control the path (operation S14, NO), the process proceeds to operation S13. In operation S14, if it is determined that it is time to control the path (operation S14, YES), the process proceeds to operation S15.

In operation S15, the memory device may provide the boosted voltage to the selected word line and to the adjacent word line. For example, the memory device may provide the boosted voltage generated by boosting the high voltage VPP using a voltage pump to a selected word line and to an adjacent word line. The boosted voltage may include a voltage signal having a target level corresponding to a program voltage level and a voltage signal having a target level corresponding to an adjacent word line voltage level.

Figure 6:
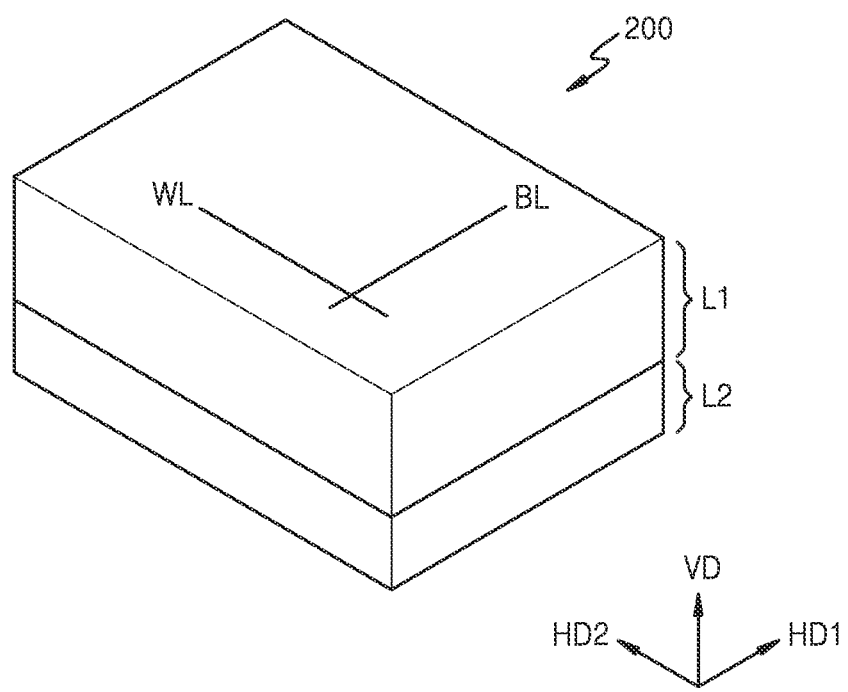
FIG. 6 is a diagram schematically illustrating a structure of the memory device of the memory system of FIG. 1, according to some example embodiments.

FIG. 6 is a diagram schematically illustrating the structure of the memory device 200 of FIG. 1, according to some embodiments. In FIG. 6, a cell over periphery (COP) structure is exemplified as an implementation example of the memory device 200, but example embodiments are not limited thereto, and the memory device 200 may be implemented through other structures.

Referring to FIGS. 1 and 6, the memory device 200 may include a first semiconductor layer L1 and a second semiconductor layer L2, and the first semiconductor layer L1 may be stacked in a vertical direction VD with respect to the second semiconductor layer L2. In particular, the second semiconductor layer L2 may be disposed below the first semiconductor layer L1 in a vertical direction VD, and accordingly, the second semiconductor layer L2 may be disposed close to a substrate.

In some example embodiments, the memory cell array 210 of FIG. 1 may be formed in the first semiconductor layer L1, and the peripheral circuit discussed above may be formed in the second semiconductor layer L2. Accordingly, the memory device 200 may have a structure in which the memory cell array 210 is disposed on top of the peripheral circuit, that is, the COP structure. The area of the COP structure may be effectively reduced in a horizontal direction and accordingly, the degree of integration of the memory device 200 may be improved.

In some example embodiments, the second semiconductor layer L2 may include a substrate, and a peripheral circuit may be formed in the second semiconductor layer L2 by forming, on the substrate, transistors and metal patterns for wiring the transistors. After the peripheral circuit is formed in the second semiconductor layer L2, the first semiconductor layer L1 including the memory cell array 210 may be formed, and metal patterns may be formed to electrically connect word lines WL and bit lines BL of the memory cell array 210 and peripheral circuits formed on the second semiconductor layer L2. For example, the bit lines BL may extend in the first horizontal direction HD1, and the word lines WL may extend in the second horizontal direction HD2.

Figure 7:
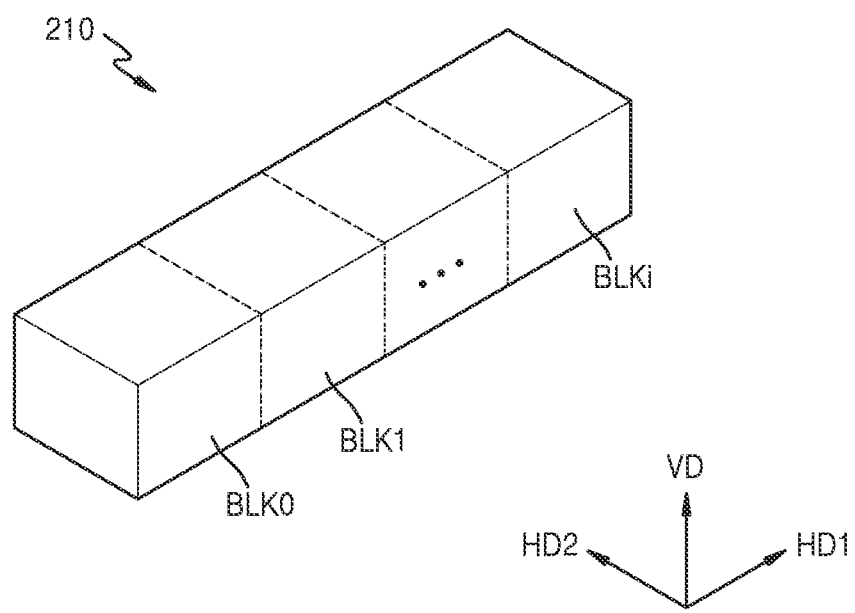
FIG. 7 is a diagram illustrating as an example a memory cell array of the memory system of FIG. 1 according to some example embodiments.

FIG. 7 is a diagram illustrating as an example the memory cell array 210 of FIG. 1 according to some example embodiments.

Referring to FIGS. 1, 2, and 7, the memory cell array 210 may include a plurality of memory blocks BLK0 to BLKi, where i may be a positive integer. Each of the plurality of memory blocks BLK0 to BLKi may have a 3D structure (or vertical structure). Specifically, each of the plurality of memory blocks BLK0 to BLKi may include a plurality of NAND strings extending in the vertical direction VD. In this case, the plurality of NAND strings may be provided to be spaced apart by a certain distance in the first and second horizontal directions HD1 and HD2. The plurality of memory blocks BLK0 to BLKi may be selected by the row decoder 240. For example, the row decoder 240 may select a memory block corresponding to a block address from among the plurality of memory blocks BLK0 to BLKi.

Figure 8:
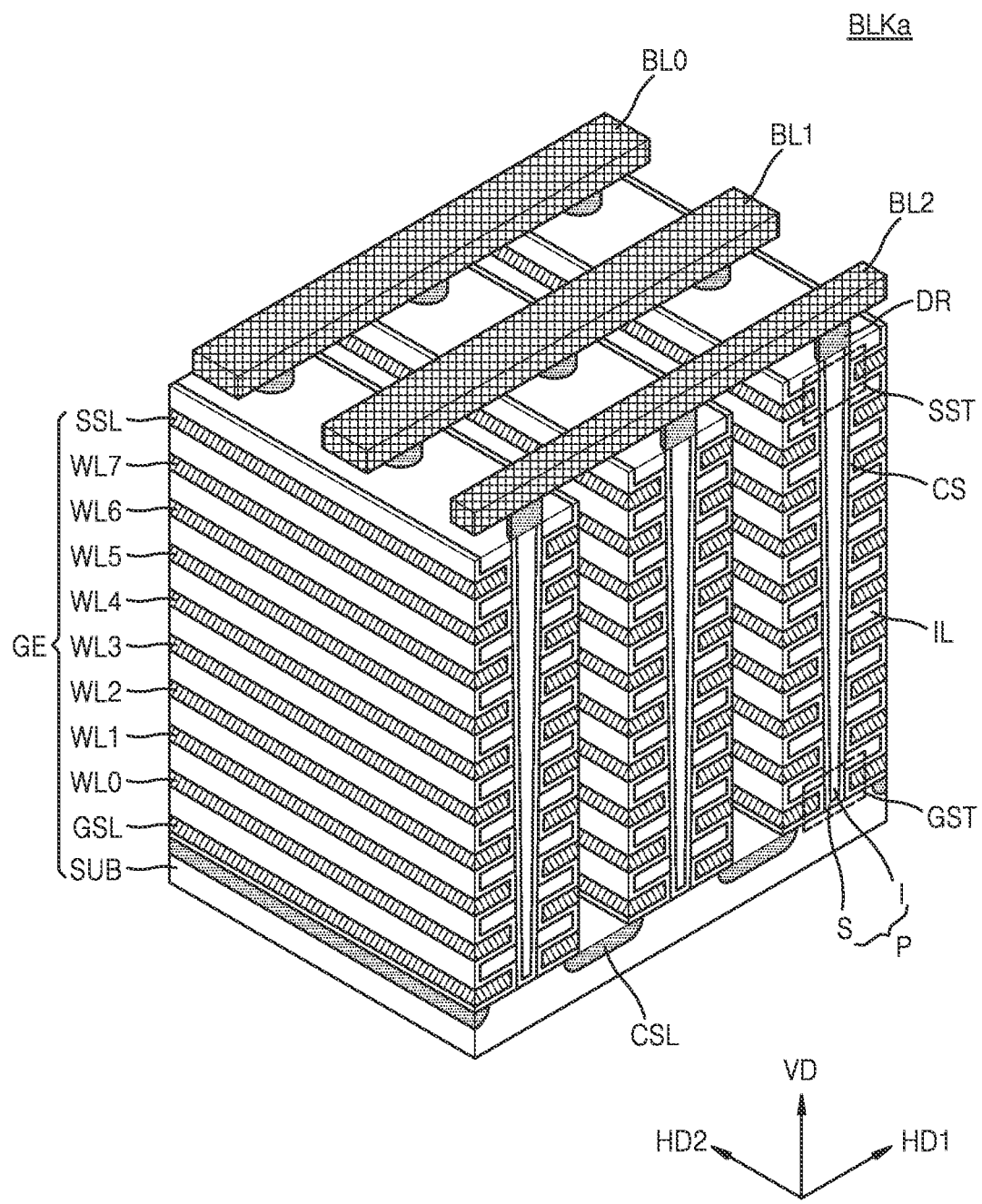
FIG. 8 is a perspective view illustrating a memory block BLKa of the memory cell array of FIG. 7 according to some example embodiments.

FIG. 8 is a perspective view illustrating a memory block BLKa of FIG. 7 according to some example embodiments.

Referring to FIGS. 7 and 8, the memory block BLKa is formed in a direction perpendicular to a substrate SUB. The substrate SUB has a first conductivity type (e.g., p-type) and extends in the second horizontal direction HD2 on the substrate SUB, and a common source line CSL doped with impurities of a second conductivity type (e.g., n-type) is provided. On the region of the substrate SUB between two adjacent common source lines CSL, a plurality of insulating layers IL extending in the second horizontal direction HD2 are sequentially provided in the vertical direction VD, and the plurality of insulating layers IL are spaced apart from each other by a particular distance in the vertical direction VD. For example, the plurality of insulating layers IL may include an insulating material, such as silicon oxide.

On the region of the substrate SUB between two adjacent common source lines CSL, a plurality of pillars P sequentially disposed in the first horizontal direction HD1 and penetrating the plurality of insulating layers IL in the vertical direction VD are provided. For example, the plurality of pillars P may penetrate the plurality of insulating layers IL to contact the substrate SUB. Specifically, a surface layer S of each pillar P may include the first type of silicon material and function as a channel region. An inner layer I of each pillar P may include an insulating material, such as silicon oxide or an air gap.

In a region between two adjacent common source lines CSL, a charge storage layer CS is provided along exposed surfaces of the insulating layers IL, the pillars P, and the substrate SUB. The charge storage layer CS may include a gate insulating layer (also referred to as a 'tunneling insulating layer'), a charge trap layer, and a blocking insulating layer. For example, the charge storage layer CS may have an oxide-nitride-oxide (ONO) structure. In a region between two adjacent common source lines CSL, gate electrodes GE, such as select lines GSL and SSL and word lines WL0 to WL7, are provided on the exposed surface of the charge storage layer CS.

Drains or drain contacts DR are provided on the plurality of pillars P, respectively. For example, the drains or drain contacts DR may include a silicon material doped with impurities having the second conductivity type. Bit lines BL1 to BL3 extending in the first horizontal direction HD1 and spaced apart from each other by a particular distance in the second horizontal direction HD2 are provided on the drains DR.

Figure 9:
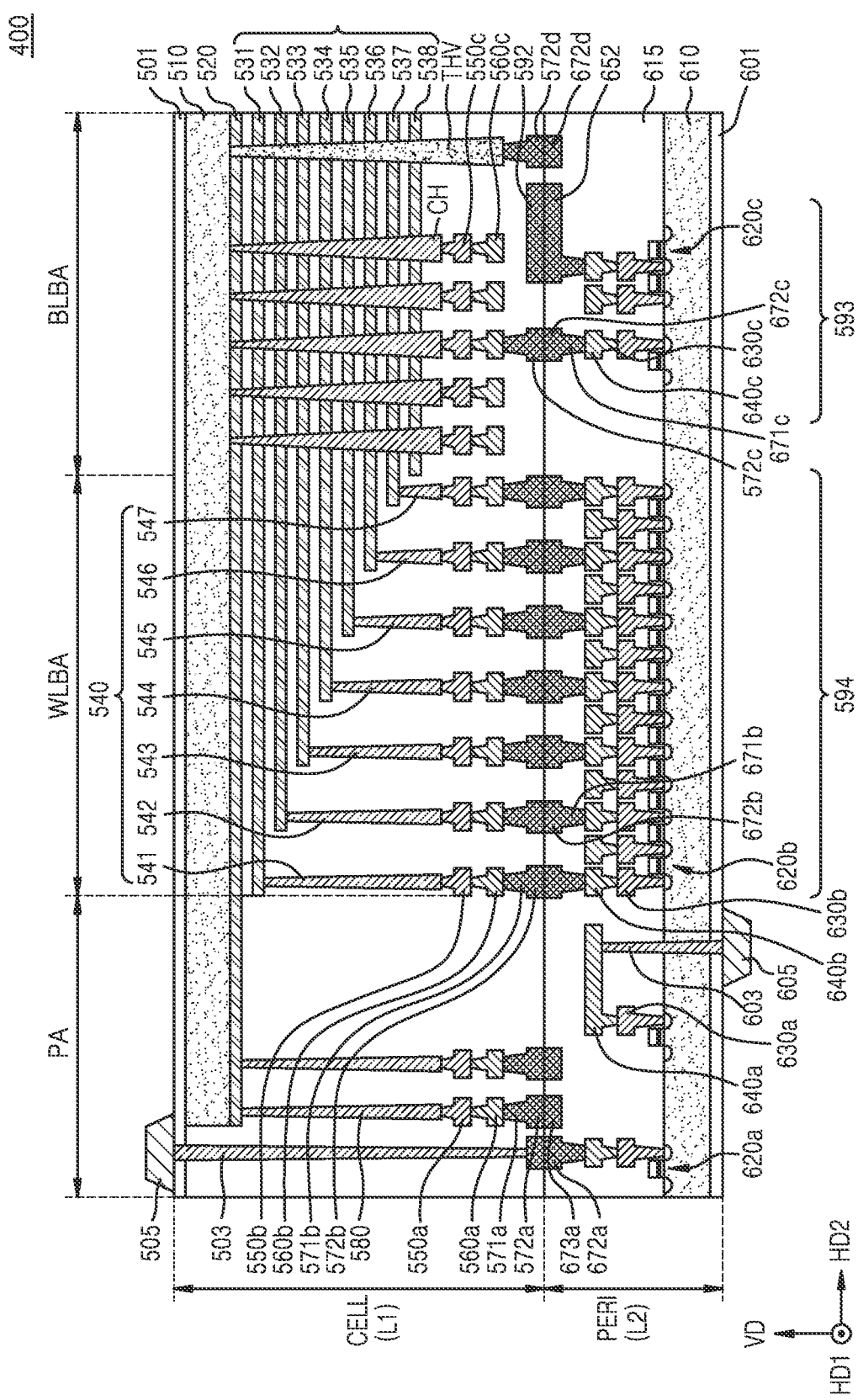
FIG. 9 is a cross-sectional view of a memory device having a B-VNAND structure, according to some example embodiments.

FIG. 9 is a cross-sectional view of a memory device having a Bonding Vertical NAND (B-VNAND) structure, according to some example embodiments. When a non-volatile memory included in the memory device is implemented as a B-VNAND type flash memory, the non-volatile memory may have a structure shown in FIG. 9.

Referring to FIG. 9, a cell area CELL of a memory device 400 may correspond to the first semiconductor layer L1, and a peripheral circuit area PERI thereof may correspond to the second semiconductor layer L2. Each of the peripheral circuit area PERI and the cell area CELL of the memory device 400 may include an external pad bonding area PA, a word line bonding area WLBA, and a bit line bonding area BLBA. For example, the plurality of word lines WL, the plurality of string select lines SSL, the plurality of ground select lines GSL, and the memory cell array 210 of FIG. 2 may be formed in the first semiconductor layer L1, and the voltage generator 220, the control logic 230, the row decoder 240, and the page buffer 250 may be formed in the second semiconductor layer L2.

The peripheral circuit area PERI may include a first substrate 610, an interlayer insulating layer 615, a plurality of circuit elements 620a, 620b, and 620c formed on the first substrate 610, first metal layers 630a, 630b, and 630c respectively connected to the plurality of circuit elements 620a, 620b, and 620c, and second metal layers 640a, 640b, and 640c formed on the first metal layers 630a, 630b, and 630c. In some example embodiments, the first metal layers 630a, 630b, and 630c may be formed of tungsten having relatively high resistance, and the second metal layers 640a, 640b, and 640c may be formed of copper having relatively low resistance.

In this specification, only the first metal layers 630a, 630b, and 630c and the second metal layers 640a, 640b, and 640c are shown, but are not limited thereto, and at least one metal layer may be further formed on the second metal layers 640a, 640b, and 640c. At least some of the at least one metal layer formed on the second metal layers 640a, 640b, and 640c may be formed of aluminum or the like having a lower resistance than copper forming the second metal layers 640a, 640b, and 640c.

The interlayer insulating layer 615 is disposed on the first substrate 610 to cover the plurality of circuit elements 620a, 620b, and 620c, the first metal layers 630a, 630b, and 630c, and the second metal layers 640a, 640b, and 640c, and may include an insulating material, such as silicon oxide, silicon nitride, or the like.

Lower bonding metals 671b and 672b may be formed on the second metal layer 640b in the word line bonding area WLBA. In the word line bonding area WLBA, the lower bonding metals 671b and 672b in the peripheral circuit area PERI may be electrically connected to each other by a bonding method with upper bonding metals 571b and 572b in the cell area CELL, and the lower bonding metals 671b and 672b and the upper bonding metals 571b and 572b may be formed of aluminum, copper, tungsten, or the like.

The cell area CELL may provide at least one memory block. The cell area CELL may include a second substrate 510 and a common source line 520. On the second substrate 510, a plurality of word lines 531 to 538 (i.e., 530) may be stacked in a direction VD perpendicular to the upper surface of the second substrate 510. String select lines and ground select lines may be disposed on each of the upper and lower portions of the word lines 530, and the plurality of word lines 530 may be disposed between the string select lines and the ground select line.

In the bit line bonding area BLBA, the channel structure CH may extend in a direction perpendicular to the upper surface of the second substrate 510 to pass through the word lines 530, the string select lines, and the ground select line.

The channel structure CH may include a data storage layer, a channel layer, and a buried insulating layer, and the channel layer may be electrically connected to a first metal layer 550c and a second metal layer 560c. For example, the first metal layer 550c may be and hereinafter referred to as a bit line contact, and the second metal layer 560c may be a bit line. In some example embodiments, the bit line 560c may extend in the second horizontal direction HD2 parallel to the upper surface of the second substrate 510.

In some example embodiments, an area where the channel structure CH and the bit line 560c are disposed may be defined as a bit line bonding area BLBA. The bit line 560c may be electrically connected to circuit elements 620c providing a page buffer 593 in the peripheral circuit area PERI in the bit line bonding area BLBA. For example, the bit line 560c is connected to upper bonding metals 571c and 572c of the cell area CELL, and the upper bonding metals 571c and 572c may be connected to lower bonding metals 671c and 672c connected to circuit elements 620c of the page buffer 593. Accordingly, the page buffer 593 may be connected to the bit line 560c through the bonding metals 571c, 572c, 671c, and 672c.

In some example embodiments, the memory device 400 may further include a through electrode THV disposed in the bit line bonding area BLBA. The through electrode THV may pass through the word lines 530 and extend in the vertical direction VD. The through electrode THV may be connected to the common source line 520 and/or the upper substrate 510. Although not shown, an insulating ring may be disposed around the through electrode THV, and the through electrode THV may be insulated from the word lines 530. The through electrode THV may be connected to the peripheral circuit area PERI through the upper bonding metal 572d and the lower bonding metal 672d.

In the word line bonding area WLBA, the word lines 530 may extend in a first horizontal direction HD1 parallel to the upper surface of the second substrate 510, and may be connected to a plurality of cell contact plugs 541 to 547 (i.e., 540). The word lines 530 and the cell contact plugs 540 may be connected to each other through pads provided by extending at least some of the word lines 530 with different lengths in the vertical direction VD. A first metal layer 550b and a second metal layer 560b may be sequentially connected to upper portions of the cell contact plugs 540 connected to the word lines 530. The cell contact plugs 540 may be connected to the peripheral circuit area PERI through the upper bonding metals 571b and 572b of the cell area CELL and the lower bonding metals 671b and 672b of the peripheral circuit area PERI in the word line bonding area WLBA.

The cell contact plugs 540 may be electrically connected to circuit elements 620b providing the row decoder 594 in a peripheral circuit area PERI. In some example embodiments, operating voltages of the circuit elements 620b providing the row decoder 594 may be different from the operating voltages of the circuit elements 620c providing the page buffer 593. For example, operating voltages of circuit elements 620c providing the page buffer 593 may be higher than operating voltages of circuit elements 620b providing the row decoder 594.

A common source line contact plug 580 may be disposed in the outer pad bonding area PA. The common source line contact plug 580 is formed of a conductive material, such as a metal, a metal compound, or polysilicon, and may be electrically connected to the common source line 520. A first metal layer 550a and a second metal layer 560a may be sequentially stacked on the common source line contact plug 580. For example, an area where the common source line contact plug 580, the first metal layer 550a, and the second metal layer 560a are disposed may be defined as the outer pad bonding area PA.

Input/output pads 505 and 605 may be disposed in the outer pad bonding area PA. A lower insulating layer 601 covering a lower surface of the first substrate 610 may be formed under the first substrate 610, and a first input/output pad 605 may be formed on the lower insulating layer 601. The first input/output pad 605 may be connected to at least one of a plurality of circuit elements 620a, 620b, and 620c arranged in a peripheral circuit area PERI through a first input/output contact plug 603, and may be separated from the first substrate 610 by the lower insulating layer 601. A side insulating layer may be disposed between the first input/output contact plug 603 and the first substrate 610 to electrically separate the first input/output contact plug 603 from the first substrate 610.

An upper insulating layer 510 covering the upper surface of the second substrate 510 may be formed on the second substrate 501, and a second input/output pad 505 may be disposed on the upper insulating layer 501. The second input/output pad 505 may be connected to at least one of the plurality of circuit elements 620a, 620b, and 620c disposed in the peripheral circuit area PERI through the second input/output contact plug 503.

According to some example embodiments, the second substrate 510 and the common source line 520 may not be disposed in an area where the second input/output contact plug 503 is disposed. In some example embodiments, the second input/output pad 505 may not overlap with the word lines 530 in the third direction (Z-axis direction). The second input/output contact plug 503 may be separated from the second substrate 510 in a direction parallel to the upper surface of the second substrate 510, and may be connected to the second input/output pad 505 through the interlayer insulating layer of the cell area CELL.

According to some example embodiments, the first input/output pad 605 and the second input/output pad 505 may be selectively formed. For example, the memory device 300 may include only the first input/output pad 605 disposed on the first substrate 610, or may include only the second input/output pad 505 disposed on the second substrate 510. In some example embodiments, the memory device 300 may include both the first input/output pad 605 and the second input/output pad 505.

In each of the outer pad bonding area PA and the bit line bonding area BLBA respectively included in the cell area CELL and the peripheral circuit area PERI, the metal pattern of the uppermost metal layer may exist as a dummy pattern, or the uppermost metal layer may be empty.

In relation to the memory device 400, as corresponding to the upper metal pattern 572a formed on the uppermost metal layer of the cell area CELL, a lower metal pattern 673a having the same shape as the upper metal pattern 572a may be formed on the uppermost metal layer of the peripheral circuit area PERI in the outer pad bonding area PA. The lower metal pattern 673a formed on the uppermost metal layer of the peripheral circuit area PERI may not be connected to a separate contact in the peripheral circuit area PERI. Similarly, in correspondence to the lower metal pattern formed on the uppermost metal layer of the peripheral circuit area PERI in the outer pad bonding area PA, an upper metal pattern having the same shape as the lower metal pattern of the peripheral circuit area PERI may be formed on the upper metal layer of the cell area CELL.

Lower bonding metals 671b and 672b may be formed on the second metal layer 640b of the word line bonding area WLBA. In the word line bonding area WLBA, the lower bonding metals 671b and 672b of the peripheral circuit area PERI may be electrically connected to each other through a bonding method with the upper bonding metals 571b and 572b of the cell area CELL.

In some example embodiments, in the bit line bonding area BLBA, as corresponding to the lower metal pattern 652 formed on the uppermost metal layer of the peripheral circuit area PERI, an upper metal pattern 592 having the same shape as the lower metal pattern 652 may be formed on the uppermost metal layer of the cell area CELL. A contact may not be formed on the upper metal pattern 592 formed on the uppermost metal layer of the cell area CELL.

Figure 10A:
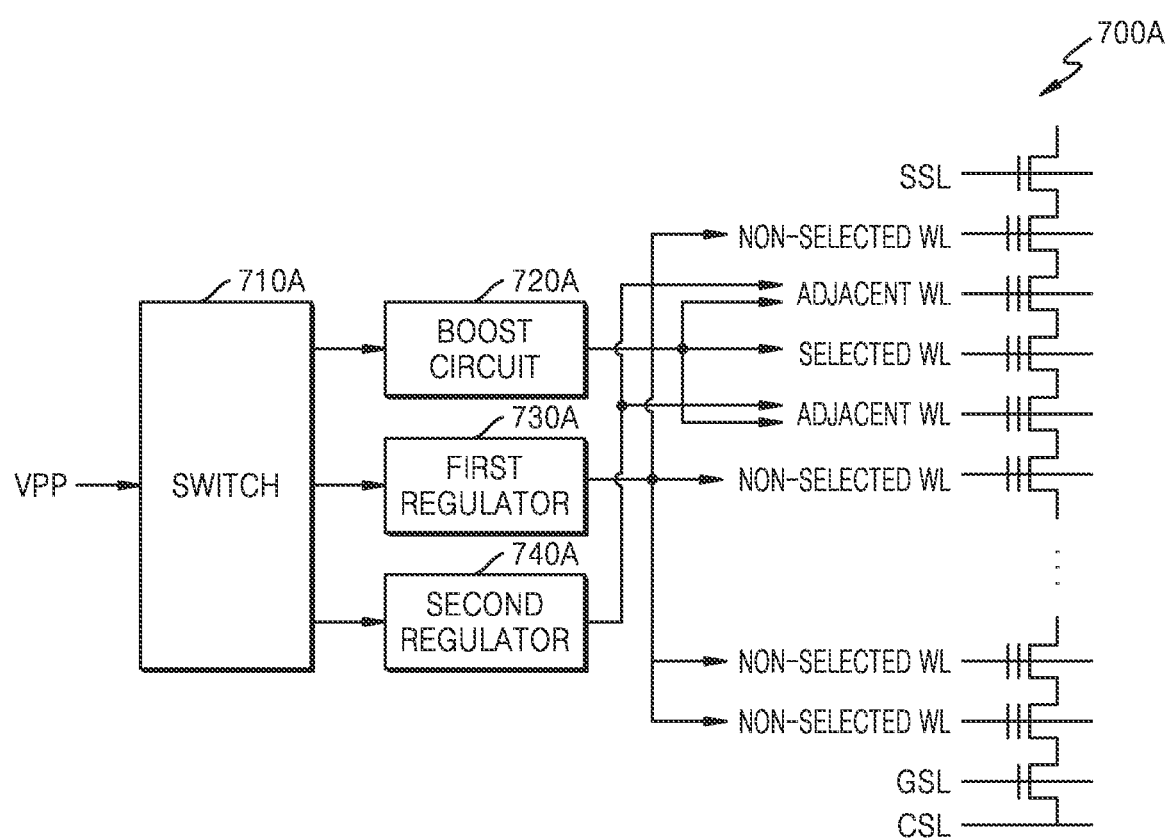
FIGS. 10A and 10B are diagrams illustrating certain implementation examples of memory devices according to some example embodiments.
Figure 10B:
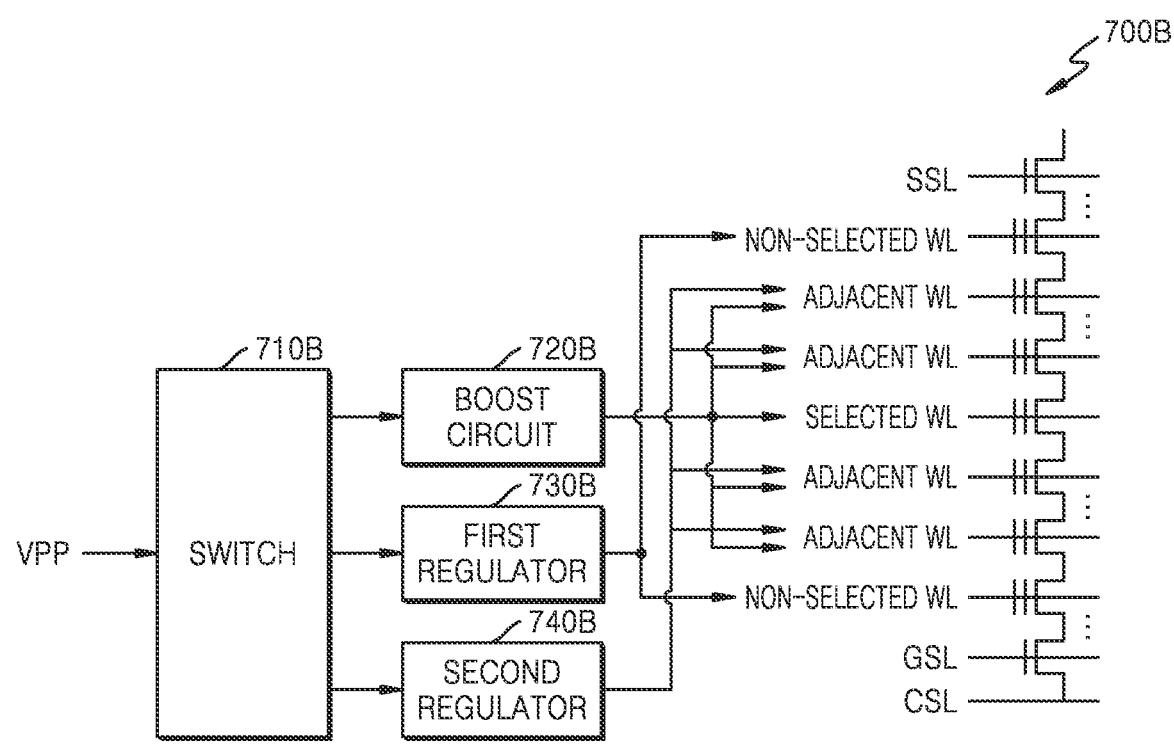

FIGS. 10A and 10B are diagrams illustrating certain implementation examples of memory devices according to some example embodiments.

Referring to FIG. 10A, a memory device 700A may include a switch 710A, a boost circuit 720A, a first regulator 730A, and a second regulator 740A. In some example embodiments, the boost circuit 720A may include a voltage pump. The memory device 700A may include a memory cell array including a string select line SSL, a ground select line GSL, a common source line CSL, and a plurality of word lines, and the plurality of word lines may include a selected word line (SELECTED WL), non-selected word lines (NON-SELECTED WL), and at least one adjacent word line (ADJACENT WL).

Each of the first regulator 730A and the second regulator 740A may receive the high voltage VPP provided from the outside of the memory device 700A and generate a regulating voltage having a lower level than the high voltage VPP. As an example, the first regulator 730A may generate a non-selected word line voltage, the second regulator 740A may generate an adjacent word line voltage, and the first regulator 730A may have a lower target level than the second regulator 740A.

In the course of performing a plurality of program loops, the boosted voltage from the boost circuit 720A and the regulating voltage from the second regulator 740A may be selectively provided to adjacent word lines. For example, according to some example embodiments, after the regulating voltage from the second regulator 740A is provided to an adjacent word line, a boosted voltage from the boost circuit 720A may be provided at a preset timing.

Referring to FIG. 10B, an example in which voltage signals according to some example embodiments are provided to a plurality of adjacent word lines that are adjacent to a selected word line is illustrated. The memory device 700B may correspond to a VNAND and may include a switch 710B, a boost circuit 720B, a first regulator 730B, and a second regulator 740B. When the memory device 700B of FIG. 10B corresponds to a VNAND, the memory device 700B may provide a voltage signal to two or more adjacent word lines adjacent to the top of the selected word line and two or more adjacent word lines adjacent to the bottom of the selected word line. As an example, the switch 710B may provide the high voltage VPP to the boost circuit 720B, the first regulator 730B, and the second regulator 740B, and after the regulating voltage from the second regulator 740B is provided to adjacent word lines, a boosted voltage from the boost circuit 720B may be provided at a preset timing.

Figure 11:
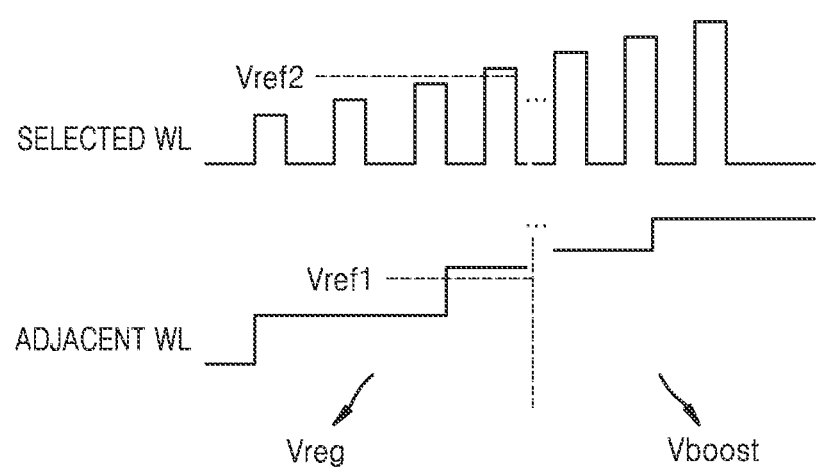
FIG. 11 is a diagram illustrating an operation example of a memory device according to some example embodiments.

FIG. 11 is a diagram illustrating an operation example of a memory device according to some example embodiments. In the example shown in FIG. 11, a case in which a voltage signal whose level increases at least once in a stepwise manner is provided to an adjacent word line is provided. For example, adjacent word line voltage levels may have the same value in at least two program loops.

As the program voltage according to the ISPP scheme is provided to the selected word line, the level of the program voltage provided to the selected word line may gradually rise as program loops are performed. A relatively low level of adjacent word line voltage may be provided in some initial loops of the plurality of program loops, and a relatively high level of adjacent word line voltage may be provided in some subsequent loops. In some example embodiments, in some subsequent loops, a higher level of adjacent word line voltage may be provided.

According to some example embodiments, a memory device may include a voltage detector (not shown) for detecting a level of an internal voltage signal, and the voltage detector may detect the program voltage level and/or the level of an adjacent word line voltage. The voltage detector may compare the level of the adjacent word line voltage with the first reference voltage Vref1, compare the program voltage level with the second reference voltage Vref2, and generate a comparison result.

Since the adjacent word line voltage level may be controlled in relation to an increase in the program voltage level, a transfer path of a voltage signal may be changed by detecting either the program voltage level or the adjacent word line voltage level. In some example embodiments, a combination of detection results of the program voltage level and the adjacent word line voltage level may be used.

When the voltage level of the adjacent word line is lower than the first reference voltage Vref1, an operation in which the regulating voltage (Vreg) is provided to the adjacent word line may be maintained. On the other hand, when the voltage level of the adjacent word line is greater than the first reference voltage Vref1, the boosted voltage (Vboost) may be provided to the adjacent word line by changing the transfer path of the voltage signal in increasing the level of the adjacent word line voltage. For example, when it is detected that the voltage level of an adjacent word line is greater than the first reference voltage Vref1, the transfer path may be controlled so that the boosted voltage is provided to the adjacent word line at the rising timing of the next adjacent word line voltage level.

In some example embodiments, when the level of the selected word line voltage is lower than the second reference voltage Vref2, an operation in which the regulating voltage is provided to an adjacent word line may be maintained. On the other hand, when it is detected that the level of the selected word line voltage is greater than the second reference voltage Vref2, at the next rising timing of the adjacent word line voltage level, the transfer path may be controlled so that the boosted voltage is provided to the adjacent word line.

In the example shown in FIG. 11, an example of detecting the case where the adjacent word line voltage level is greater than the first reference voltage Vref1 has been described, but example embodiments are not limited thereto. As an example, in some example embodiments, a transfer path may be controlled based on an operation in which a threshold is set and a level difference between an adjacent word line voltage and the first reference voltage Vref1 is compared with the threshold. The threshold may be preset. In some example embodiments, the transfer path may be controlled based on detection and comparison operations of various other methods.

Figure 12:
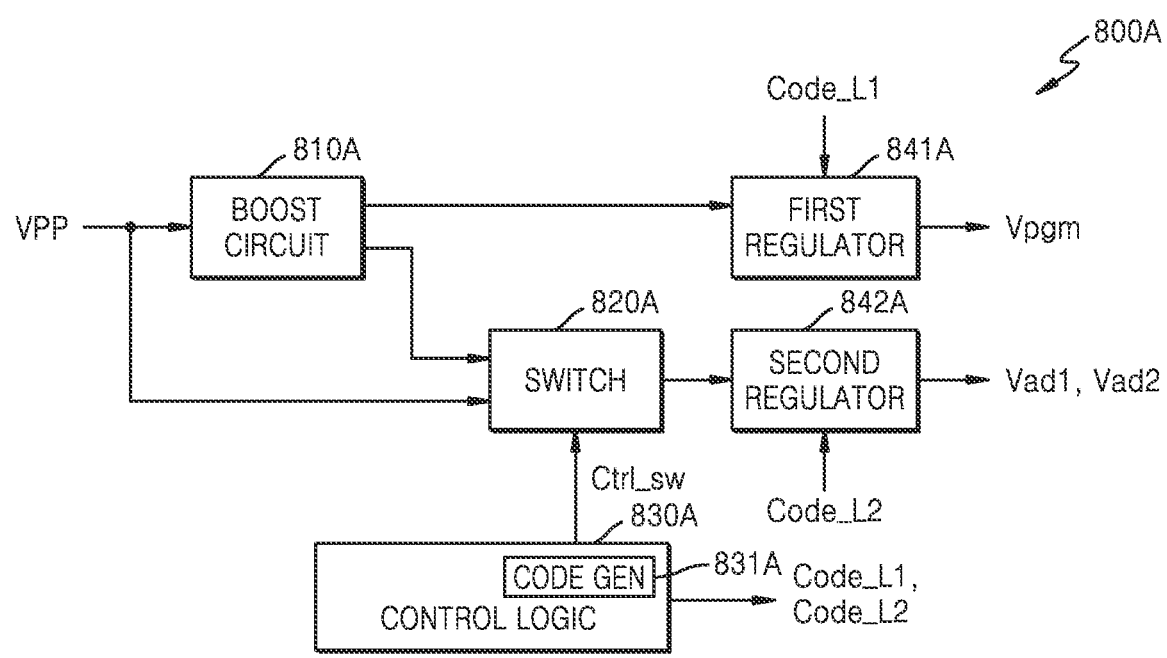
FIGS. 12 and 13 are block diagrams illustrating examples of controlling a voltage transfer path according to some example embodiments.
Figure 13:
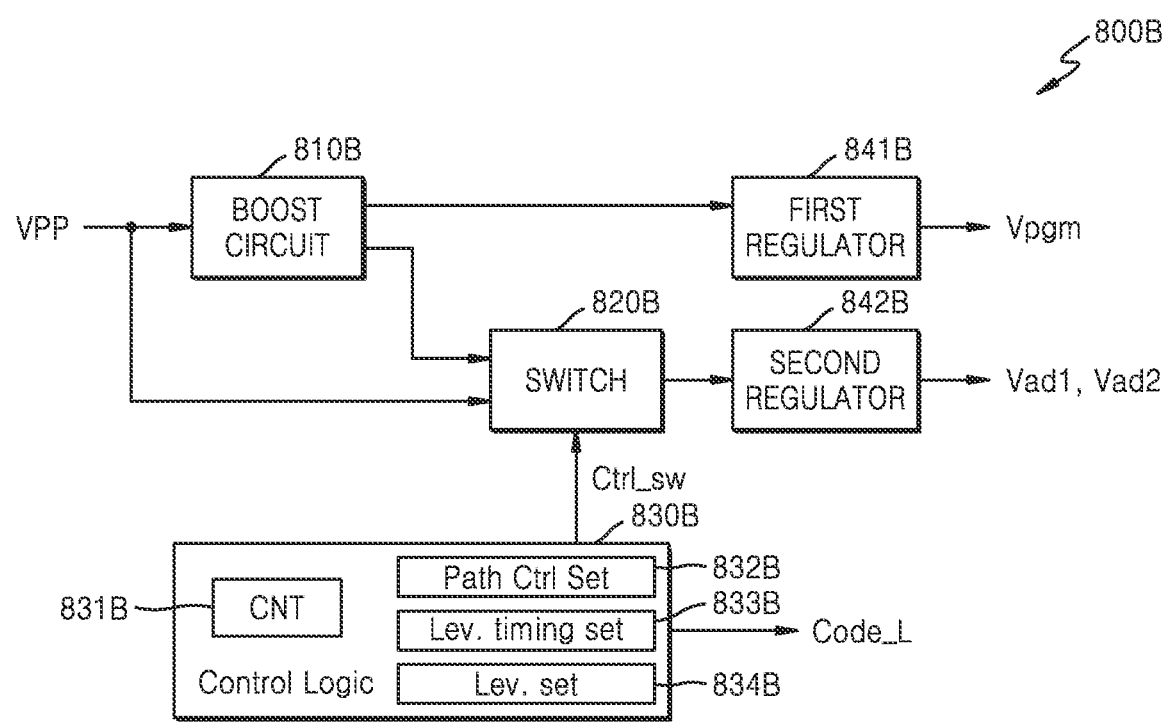

FIGS. 12 and 13 are block diagrams illustrating examples of controlling a voltage transfer path according to some example embodiments.

Referring to FIG. 12, a memory device 800A may include a boost circuit 810A, a switch 820A, a control logic 830A, and a first regulator 841A, and a second regulator 842A. The control logic 830A may include a level code generator (Code Gen) 831A.

According to some example embodiments, the boost circuit 810A may perform a boosting process for a high voltage VPP from the outside, and the switch 820A may receive the high voltage VPP and the boosted voltage and selectively output either one. The first regulator 841A may receive a first level code Code_L1 and may perform regulating processing on the boosted voltage and output a program voltage Vpgm, based on the first level code Code_L1. For example, the first regulator 841A may generate a program voltage Vpgm having a target level corresponding to the first level code Code_L1.

The second regulator 842A may perform a regulating process for the high voltage VPP in the first section, and provide the first adjacent word line voltage Vad1 having a relatively low level to the adjacent word line. The second regulator 842A may receive a second level code Code_L2 and may perform a regulating process for the boosted voltage in the second section including some loops after the first section, and provide the second adjacent word line voltage Vad2 having a relatively high level to the adjacent word line, based on the second level code Code_L2. For example, the second adjacent word line voltage Vad2 output from the second regulator 842A may have a target level corresponding to the second level code Code_L2.

As the program loops are performed, the control logic 830A may generate the first and second level codes Code_L1 and Code_L2 that control target levels of the first and second regulators 841A and 842A. The control logic 830A may determine the level of the adjacent word line voltage by determining the first and second level codes Code_L1 and Code_L2, and when the level of the adjacent word line voltage exceeds the level of the high voltage VPP, the control logic 830A may control the switch 820A to selectively output a boosted voltage by providing the switch control signal Crtl_sw.

Referring to FIG. 13, the memory device 800B may include a boost circuit 810B, a switch 820B, a control logic 830B, and a first regulator 841B and a second regulator 841B. The control logic 830B may include a counter (CNT) 831B and various types of setting information, and as an example, the various setting information may include path control setting information (Path Ctrl Set) 832B, level timing setting information (Lev. timing set) 833B, and level setting information (Lev. set) 845B. Although not shown in FIG. 13, the control logic 830B may include a volatile or non-volatile storage circuit, and the various setting information may be stored in the volatile or non-volatile storage circuit.

The counter 831B may count the number of executions of a plurality of program loops, and the control logic 830B may control the overall program operation of the memory device 800B by comparing the counting value with various pieces of setting information. As an example, the level of a voltage provided to an adjacent word line may rise at least once in performing program loops, and the control logic 830B may compare the counting value with the level timing setting information 833B to determine the change timing of the level of the adjacent word line voltage. In some example embodiments, the control logic 830B may generate a level code for controlling the level of an adjacent word line voltage based on the level setting information 845B.

The control logic 830B may control a voltage path related to generating an adjacent word line voltage by comparing the counting value with the path control setting information 832B. As an example, when the counting value indicates that a certain number of program loops have been performed, to generate a relatively high level of adjacent word line voltage, the control logic 830B may control the switch 820B to selectively output a boosted voltage by providing the switch control signal Crtl_sw.

Below, a case in which various example embodiments are applied to a read operation or a verify operation is exemplified.

Figure 14:
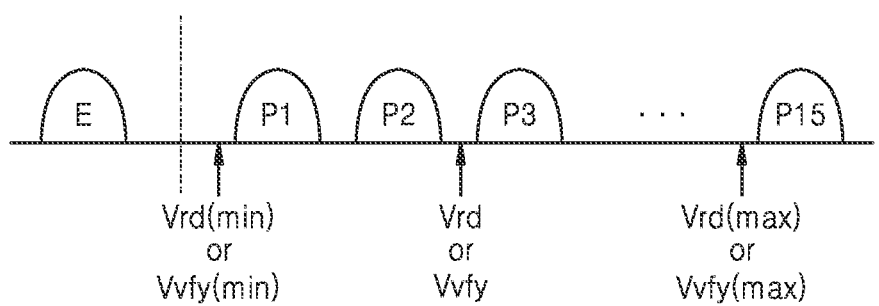
FIG. 14 is a diagram illustrating an example of threshold voltage distribution of a plurality of memory cells, according to some example embodiments.

FIG. 14 is a diagram illustrating an example of threshold voltage distribution of a plurality of memory cells, according to some example embodiments. In FIG. 14, as each memory cell stores 4-bit data, a case in which memory cells include 16 threshold voltage distributions is exemplified, and as an example, an erase state E and first to fifteenth program states P1 to P15 may be included.

In performing a read and verify operation for each memory cell, a plurality of sensing operations may be performed to determine multiple threshold voltage distributions, and a read voltage Vrd or a verify voltage Vvfy may be provided to the selected word line. On the other hand, a pass voltage for turning on a memory cell may be applied to non-selected word lines, and the pass voltage may have a higher level than the read voltage Vrd or the verify voltage Vvfy.

To improve the accuracy of read and verify operations, it is advantageous for a relatively high level of pass voltage to be provided to the non-selected word lines so that the memory cells are sufficiently turned on, and in this case, equivalent resistances of memory cells connected to non-selected word lines may have a low value. In some example embodiments, the equivalent resistance of a memory cell adjacent to a selected memory cell on which reading or verifying is performed needs to be low, and in this case, the pass voltage provided to the adjacent word line may have a higher level than the pass voltage provided to the remaining non-selected word lines.

To determine the erase state E and the first to fifteenth program states P1 to P15, in the case of determining states having a high threshold voltage level, the level of the read voltage Vrd or the verify voltage Vvfy may increase. As an example, the level of the read voltage Vrd or the verify voltage Vvfy for determining the erase state E and the first program state P1 may have a minimum value, and the level of the read voltage Vrd or the verify voltage Vvfy for determining the fourteenth program state P14 and the fifteenth program state P15 may have a maximum value.

In example some example embodiments, the level of the read voltage Vrd or the verify voltage Vvfy may be lower than the level of the external high voltage VPP. On the other hand, the pass voltage provided to the adjacent word line may be lower or higher than the level of the high voltage VPP according to threshold voltage distributions. Accordingly, the pass voltage generated through the regulating process for the high voltage VPP or the pass voltage generated through the boosting process may be provided to the adjacent word line.

Figure 15:
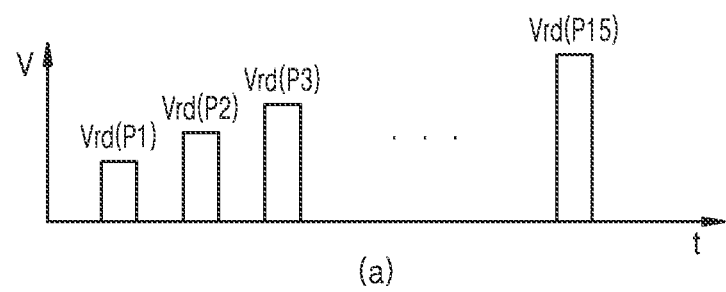
FIG. 15 is a diagram illustrating an example in which a level of a voltage provided to an adjacent word line varies in a read operation, according to some example embodiments.
Figure 15:
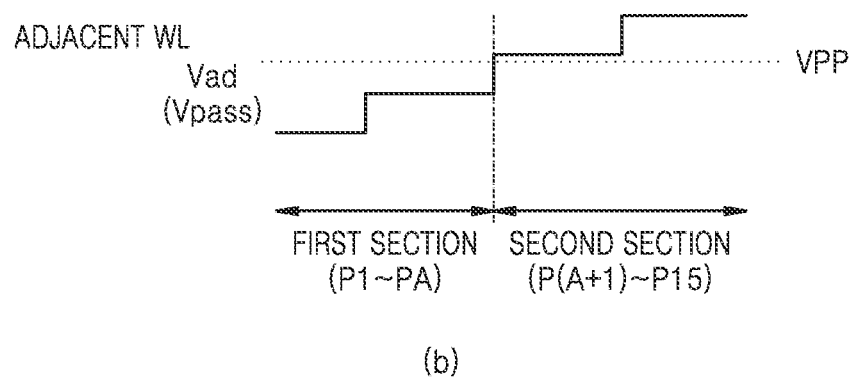

FIG. 15 is a diagram illustrating an example in which a level of a voltage provided to an adjacent word line varies in a read operation, according to some example embodiments.

Referring to (a) of FIG. 15, the level of the read voltage Vrd provided to the selected word line for determining the first to fifteenth program states P1 to P15 is shown. In some example embodiments, as a method of improving the characteristics of a read operation and securing a voltage difference between a selected word line and an adjacent word line, the level of an adjacent word line voltage (pass voltage) provided to an adjacent word line may be changed at least once. As an example, referring to (b) of FIG. 15, in response to an increase in the level of the read voltage Vrd according to the process of determining the first to fifteenth program states P1 to P15, an adjacent word line voltage Vad whose level increases stepwise at least once is exemplified. In (b) of FIG. 15, the case where the level of the adjacent word line voltage fluctuates less than the number of times the level of the selected word line voltage fluctuates is exemplified, but example embodiments are not limited thereto and, in some example embodiments, the level of an adjacent word line voltage may be changed to correspond to the change in the level of the selected word line voltage.

In the example shown in FIG. 15, in the first section P1 to PA for determining some threshold voltage states, the adjacent word line voltage Vad may be lower than the level of the high voltage VPP, and accordingly, the adjacent word line voltage Vad generated through the regulating process for the high voltage VPP may be provided to the adjacent word line. On the other hand, in the second section P(A+1) to P15, the adjacent word line voltage Vad may be higher than the level of the high voltage VPP, and accordingly, the adjacent word line voltage Vad generated by boosting the high voltage VPP may be provided to the adjacent word line.

Figure 16:
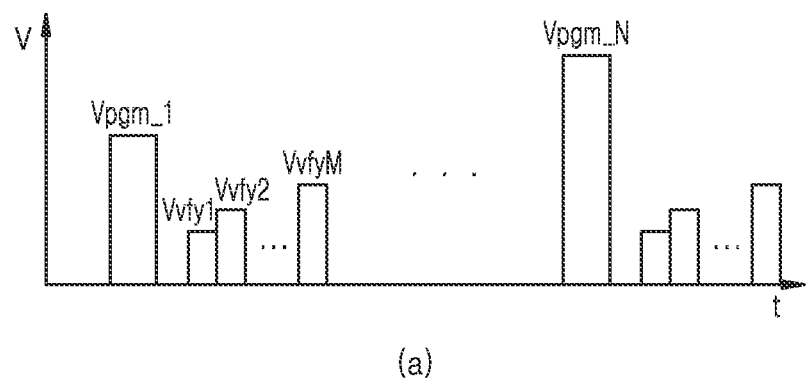
FIG. 16 is a diagram illustrating an example in which a level of a voltage provided to an adjacent word line varies in a verify operation, according to some example embodiments.
Figure 16:
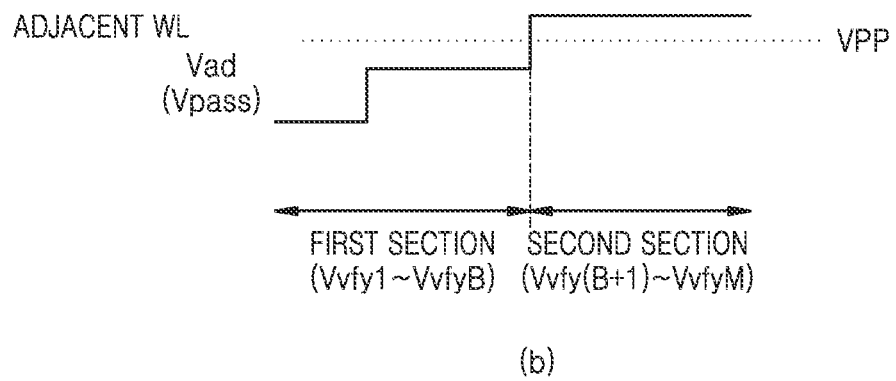

FIG. 16 is a diagram illustrating an example in which a level of a voltage provided to an adjacent word line varies in a verify operation, according to some example embodiments.

As shown in (a) of FIG. 16, after the program is executed in each of the program loops, a verify operation may be performed to determine whether a plurality of memory cells program pass/fail, and the verify operation may include multiple sensing operations using verify voltage Vvfy to determine multiple threshold voltage distributions. As each memory cell is programmed to one of a plurality of threshold voltage distributions, in the verify operation, sensing operations using multiple levels of verify voltage Vvfy may be sequentially performed, and accordingly, a verify voltage Vvfy whose level gradually increases may be provided to the selected word line.

Referring to (b) of FIG. 16, identically or similarly to the embodiment illustrated in FIG. 15, as the level of the voltage provided to the selected word line increases, the level of the adjacent word line voltage also rises at least once. As an example, in the first section Vvfy1 to VvfyB for verifying some of the relatively low level states among a plurality of threshold voltage states, the adjacent word line voltage Vad may be lower than the level of the high voltage VPP, and accordingly, the adjacent word line voltage Vad generated through the regulating process for the high voltage VPP may be provided to the adjacent word line. On the other hand, in the second section Vvfy(B+1) to VvfyM for verifying some other relatively high-level states, the adjacent word line voltage Vad may be higher than the level of the high voltage VPP, and accordingly, the adjacent word line voltage Vad generated by boosting the high voltage VPP may be provided to the adjacent word line.

Figure 17:
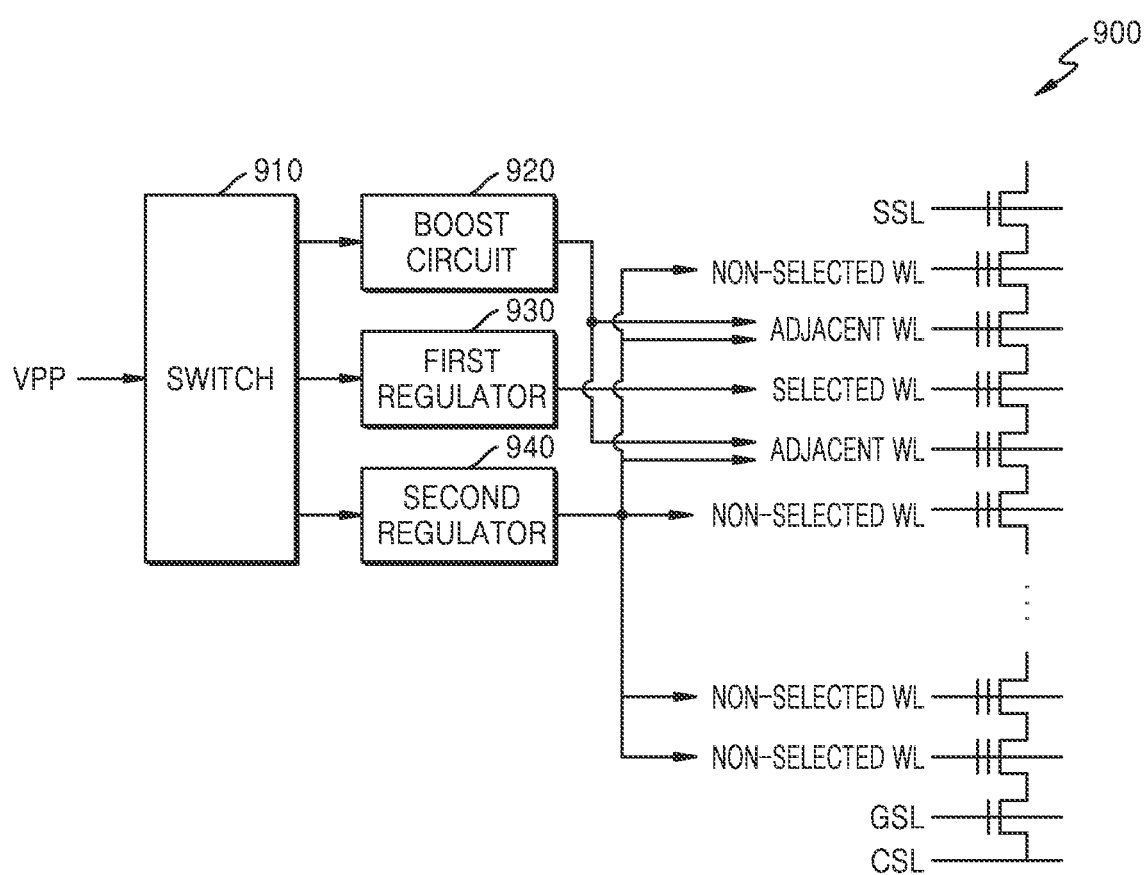
FIG. 17 is a diagram illustrating a memory device illustrating a read operation according to some example embodiments.

FIG. 17 is a diagram illustrating a memory device illustrating a read operation in some example embodiments. In FIG. 17, a read operation of the memory device 900 is exemplified, but the same or similar may be applied to a verify operation.

The memory device 900 may include a switch 910, a boost circuit 920, a first regulator 930, and a second regulator 940, and the plurality of word lines may include a string select line SSL, a plurality of word lines WL, a ground select line GSL, and a common source line CSL. In a read operation, the plurality of word lines WL may include a selected word line, at least one adjacent word line, and a plurality of non-selected word lines.

In a read operation according to some example embodiments, in relation to voltages provided to a plurality of word lines, a selected word line voltage may have a low level while an adjacent word line voltage is relatively high. In some example embodiments, the first regulator 930 may have a first target level, the second regulator 940 may have a second target level, and the first target level may have a lower value than the second target level.

In some example embodiments, when the level of the selected word line is the lowest, the voltage from the first regulator 930 may be provided to the selected word line as the selected word line voltage. The second regulator 940 may generate a voltage having a higher level than the selected word line voltage and provide the non-selected word line voltage to the plurality of non-selected word lines.

The adjacent word line voltage may be higher or lower than the level of the high voltage VPP according to the threshold voltage state in which the determination is performed. Accordingly, in sensing operations for determining some threshold voltage states, the adjacent word line voltage Vad generated through the regulating process for the high voltage VPP may be provided to the adjacent word line. In sensing operations for determining other threshold voltage states, the adjacent word line voltage Vad generated through boosting of the high voltage VPP may be provided to the adjacent word line.

Figure 18:
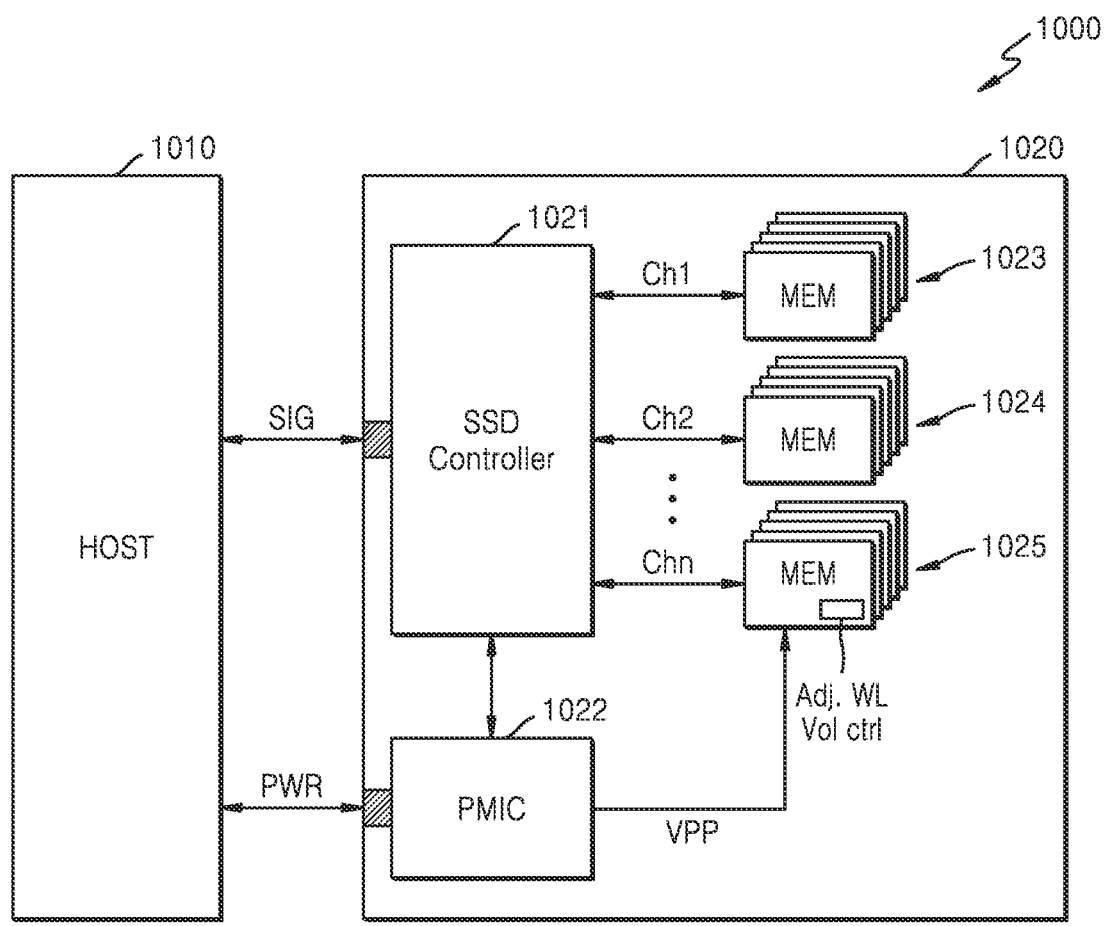
FIG. 18 is a block diagram illustrating a solid state disk (SSD) system to which a memory device according to various example embodiments is applied.

FIG. 18 is a block diagram illustrating an SSD system 700 to which a memory device according to some example embodiments is applied.

Referring to FIG. 18, an SSD system 1000 may include a host 1010 and an SSD 1020. The SSD 1020 exchanges a signal SIG with the host 1010 through a signal connector, and receives power PWR through a power connector. The SSD 1020 may include an SSD controller 1021, a PMIC 1022, and memory devices 1023, 1024, and 1025. The memory devices 1023, 1024, and 1025 may be non-volatile memories or vertically stacked NAND flash memory devices. In this case, the SSD 1020 may be implemented using the embodiments described above with reference to FIGS. 1 to 17. For example, each of the memory devices 1023, 1024, and 1025 may receive the high voltage VPP from the PMIC 1220 and perform boost processing and/or regulating processing on the high voltage VPP to internally generate a number of voltages related to memory operation, and in generating the adjacent word line voltage, an adjacent word line voltage may be generated by directly regulating the high voltage VPP or by regulating a boosted voltage obtained by boosting the high voltage VPP through voltage path control according to the embodiments described above.

FIG. 19 is a cross-sectional view of a memory device having a B-VNAND structure, according to some example embodiments. The non-volatile memory device or storage device in the above-described embodiments may be implemented based on the structure shown in FIG. 19.

Referring to FIG. 19, the memory device 1100 may have a chip to chip (C2C) structure. Here, the C2C structure may refer to that the at least one upper chip and the lower chip are connected to each other by a bonding method after fabricating at least one upper chip including a cell area CELL and a lower chip including a peripheral circuit area PERI, respectively. For example, the bonding method may refer to a method of electrically or physically connecting the bonding metal pattern formed in the uppermost metal layer of the upper chip to the bonding metal pattern formed in the uppermost metal layer of the lower chip to each other. For example, when the bonding metal patterns are formed of copper (Cu), the bonding method may be a Cu—Cu bonding method. As another example, the bonding metal patterns may also be formed of aluminum (Al) or tungsten (W).

The memory device 1100 may include at least one upper chip including a cell area. For example, as shown in FIG. 19, the memory device 1100 may be implemented to include two upper chips. However, this is exemplary, and the number of upper chips is not limited thereto. When the memory device 1100 is implemented to include two upper chips, after manufacturing a first upper chip including a first cell area CELL1, a second upper chip including a second cell area CELL2, and a lower chip including a peripheral circuit area PERI, respectively, the memory device 1100 may be manufactured by connecting the first upper chip, the second upper chip, and the lower chip to each other using a bonding method. The first upper chip may be reversed and connected to the lower chip by bonding, and the second upper chip may also be reversed and connected to the first upper chip by bonding. In the following description, upper and lower portions of the first and second upper chips are defined based on before the first upper chip and the second upper chip are inverted. That is, in FIG. 19, the upper part of the lower chip refers to the upper part defined based on the +Z-axis direction, and the upper part of each of the first and second upper chips refers to the upper part defined based on the −Z-axis direction. However, this is exemplary, and only one of the first upper chip and the second upper chip may be inverted and connected by a bonding method.

Each of the peripheral circuit area PERI and the first and second cell areas CELL1 and CELL2 of the memory device 1100 may include an outer pad bonding area PA, a word line bonding area WLBA, and a bit line bonding area BLBA.

The peripheral circuit area PERI may include a first substrate 1210 and a plurality of circuit elements 1220a, 1220b, and 1220c formed on the first substrate 1210. An interlayer insulating layer 1215 including one or more insulating layers may be provided on the plurality of circuit elements 1220a, 1220b, and 1220c, and a plurality of metal wires connecting the plurality of circuit elements 1220a, 1220b, and 1220c to each other may be provided in the interlayer insulating layer 215. For example, the plurality of metal wires may include first metal wires 1230a, 1230b, and 1230c respectively connected to the plurality of circuit elements 1220a, 1220b, and 1220c, and second metal wires 1240a, 1240b, and 1240c formed on the first metal wires 1230a, 1230b, and 1230c. The plurality of metal wires may be made of at least one of various conductive materials. For example, the first metal wires 1230a, 1230b, and 1230c may be formed of tungsten having a relatively high electrical resistivity, and the second metal wires 1240a, 1240b, and 1240c may be formed of copper having a relatively low electrical resistivity.

In this specification, only the first metal wires 1230a, 1230b, and 1230c and the second metal wires 1240a, 1240b, and 1240c are shown and described, but are not limited thereto, and at least one additional metal wire may be further formed on the second metal wires 1240a, 1240b, and 1240c. In this case, the second metal wires 1240a, 1240b, and 1240c may be formed of aluminum. At least some of the additional metal wires formed on the second metal wires 1240a, 1240b, and 1240c may be formed of copper having a lower electrical resistivity than aluminum of the second metal wires 1240a, 1240b, and 1240c.

The interlayer insulating layer 1215 is disposed on the first substrate 1210 and may include an insulating material, such as silicon oxide or silicon nitride.

Each of the first and second cell areas CELL1 and CELL2 may include at least one memory block. The first cell area CELL1 may include the second substrate 1310 and the common source line 1320. A plurality of word lines 1331 to 1338 (i.e., 1330) may be stacked on the second substrate 1310 in a direction (Z-axis direction) perpendicular to the upper surface of the second substrate 1310. String select lines and ground select lines may be disposed on the upper and lower portions of the word lines 1330, and the plurality of word lines 1330 may be disposed between the string select lines and the ground select line. Similarly, the second cell area CELL2 includes the third substrate 1410 and the common source line 1420, and a plurality of word lines 1431 to 1438 (i.e., 1430) may be stacked in a direction perpendicular to the upper surface of the third substrate 1410 (Z-axis direction). The second substrate 1310 and the third substrate 1410 may be made of various materials, and for example, may include a silicon substrate, a silicon-germanium substrate, a germanium substrate, or a substrate having a monocrystalline epitaxial layer grown on a monocrystalline silicon substrate. A plurality of channel structures CH may be formed in each of the first and second cell areas CELL1 and CELL2.

In some example embodiments, as shown in A1, the channel structure CH is provided in the bit line bonding area BLBA and extends in a direction perpendicular to the upper surface of the second substrate 1310 to pass through the word lines 1330, the string select lines, and the ground select line. The channel structure CH may include a data storage layer, a channel layer, and a buried insulating layer. The channel layer may be electrically connected to the first metal wire 1350c and the second metal wire 1360c in the bit line bonding area BLBA. For example, the second metal wire 1360c may be a bit line and may be connected to the channel structure CH through the first metal wire 1350c. The bit line 1360c may extend along a first direction (Y-axis direction) parallel to the upper surface of the second substrate 1310.

In some example embodiments, as shown in A2, the channel structure CH may include a lower channel LCH and an upper channel UCH connected to each other. For example, the channel structure CH may be formed through a process for the lower channel LCH and a process for the upper channel UCH. The lower channel LCH may extend in a direction perpendicular to the top surface of the second substrate 1310 and pass through the common source line 1320 and the lower word lines 1331 and 1332. The lower channel LCH may include a data storage layer, a channel layer, and a buried insulating layer, and may be connected to the upper channel UCH. The upper channel UCH may pass through the upper word lines 1333 to 1338. The upper channel UCH may include a data storage layer, a channel layer, a buried insulating layer, and the like, and the channel layer of the upper channel UCH may be electrically connected to the first metal wire 1350c and the second metal wire 1360c. As the length of the channel increases, it may be difficult to form a channel having a constant width due to process reasons. The memory device 1100 according to some example embodiments may include a channel having improved width uniformity through the lower channel LCH and the upper channel UCH formed through a sequential process.

As shown in A2, when the channel structure CH is formed to include the lower channel LCH and the upper channel UCH, a word line positioned near a boundary between the lower channel LCH and the upper channel UCH may be a dummy word line. For example, word lines 1332 and 1333 forming boundaries between the lower channel LCH and the upper channel UCH may be dummy word lines. In this case, data may not be stored in memory cells connected to the dummy word line. In some example embodiments, the number of pages corresponding to memory cells connected to a dummy word line may be less than the number of pages corresponding to memory cells connected to a general word line. The voltage level applied to the dummy word line may be different from the voltage level applied to the general word line, and accordingly, the influence of the non-uniform channel width between the lower channel LCH and the upper channel UCH on the operation of the memory device may be reduced.

In A2, it is shown that the number of lower word lines 1331 and 1332 through which the lower channel LCH passes is less than the number of upper word lines 1333 to 1338 through which the upper channel UCH passes. However, this is merely exemplary, and example embodiments are not limited thereto. As another example, the number of lower word lines passing through the lower channel LCH may be equal to or greater than the number of upper word lines passing through the upper channel UCH. The above-described structure and connection relationship of the channel structure CH disposed in the first cell area CELL1 may be equally applied to the channel structure CH disposed in the second cell area CELL2.

In the bit line bonding area BLBA, the first through electrode THV1 may be provided in the first cell area CELL1, and the second through electrode THV2 may be provided in the second cell area CELL2. As shown in FIG. 19, the first through electrode THV1 may pass through the common source line 1320 and the plurality of word lines 1330. However, this is exemplary, and the first through electrode THV1 may further penetrate the second substrate 1310. The first through electrode THV1 may include a conductive material. Alternatively, the first through electrode THV1 may include a conductive material surrounded by an insulating material. The second through electrode THV2 may also be provided in the same shape and structure as the first through electrode THV1.

In some example embodiments, the first through electrode THV1 and the second through electrode THV2 may be electrically connected to each other through the first through metal pattern 1372*d* and the second through metal pattern 1472*d*. The first through metal pattern 1372*d* may be formed on the lower end of the first upper chip including the first cell area CELL1, and the second through metal pattern 1472*d* may be formed on the upper end of the second upper chip including the second cell area CELL2. The first through electrode THV1 may be electrically connected to the first metal wire 1350*c* and the second metal wire 1360*c*. A lower via 1371*d* may be formed between the first through electrode THV1 and the first through metal pattern 1372*d*, and an upper via 1471*d* may be formed between the second through electrode THV2 and the second through metal pattern 1472*d*. The first through metal pattern 1372*d* and the second through metal pattern 1472*d* may be connected to each other by a bonding method.

In some example embodiments, in the bit line bonding area BLBA, an upper metal pattern 1252 may be formed on the uppermost metal layer of the peripheral circuit area PERI, and an upper metal pattern 1392 having the same shape as the upper metal pattern 1252 may be formed on the uppermost metal layer of the first cell area CELL1. The upper metal pattern 1392 of the first cell area CELL1 and the upper metal pattern 1252 of the peripheral circuit area PERI may be electrically connected to each other by a bonding method. In the bit line bonding area BLBA, the bit line 1360*c* may be electrically connected to a page buffer included in the peripheral circuit area PERI. For example, some of the circuit elements 1220*c* of the peripheral circuit area PERI may provide a page buffer, and the bit line 1360*c* may be electrically connected to circuit elements 1220*c* providing a page buffer through the upper bonding metal 1370*c* of the first cell area CELL1 and the upper bonding metal 1270*c* of the peripheral circuit area PERI.

Continuing to refer to FIG. 19, in the word line bonding area WLBA, the word lines 1330 of the first cell area CELL1 may extend along a second direction (X-axis direction) parallel to the upper surface of the second substrate 1310 and may be connected to the plurality of cell contact plugs 1341 to 1347 (i.e., 1340). A first metal wire 1350*b* and a second metal wire 1360*b* may be sequentially connected to upper portions of the cell contact plugs 1340 connected to the word lines 1330. The cell contact plugs 1340 may be connected to the peripheral circuit area PERI in the word line bonding area WLBA through the upper bonding metal 1370*b* of the first cell area CELL1 and the upper bonding metal 1270*b* of the peripheral circuit area PERI.

The cell contact plugs 1340 may be electrically connected to a row decoder included in a peripheral circuit area PERI. For example, some of the circuit elements 1220*b* of the peripheral circuit area (PERI) provide a row decoder, and the cell contact plugs 1340 may be electrically connected to circuit elements 1220*b* providing row decoders through the upper bonding metal 1370*b* of the first cell area CELL1 and the upper bonding metal 1270*b* of the peripheral circuit area PERI. In some example embodiments, the operating voltage of the circuit elements 1220*b* providing the row decoder may be different from the operating voltage of the circuit elements 1220*c* providing the page buffer. For example, operating voltages of circuit elements 1220*c* providing a page buffer may be higher than operating voltages of circuit elements 1220*b* providing a row decoder.

Similarly, in the word line bonding area WLBA, the word lines 1430 of the second cell area CELL2 may extend along a second direction (X-axis direction) parallel to the upper surface of the third substrate 1410, and may be connected to the plurality of cell contact plugs 1441 to 1447 (i.e., 1440). The cell contact plugs 1440 may be connected to a peripheral circuit area PERI through the upper metal pattern of the second cell area CELL2, the lower and upper metal patterns of the first cell area CELL1, and the cell contact plug 1348.

In the word line bonding area WLBA, an upper bonding metal 1370*b* may be formed in the first cell area CELL1, and an upper bonding metal 1270*b* may be formed in the peripheral circuit area PERI. The upper bonding metal 1370*b* of the first cell area CELL1 and the upper bonding metal 1270*b* of the peripheral circuit area PERI may be electrically connected to each other by a bonding method. The upper bonding metal 1370*b* and the upper bonding metal 1270*b* may be formed of aluminum, copper, or tungsten.

In the outer pad bonding area PA, a lower metal pattern 1371*e* may be formed below the first cell area CELL1, and an upper metal pattern 1472*a* may be formed above the second cell area CELL2. The lower metal pattern 1371*e* of the first cell area CELL1 and the upper metal pattern 1472*a* of the second cell area CELL2 may be connected to each other in the outer pad bonding area PA by a bonding method. Similarly, an upper metal pattern 1372a may be formed above the first cell area CELL1, and an upper metal pattern 1272a may be formed above the peripheral circuit area PERI. The upper metal pattern 1372a of the first cell area CELL1 and the upper metal pattern 1272a of the peripheral circuit area PERI may be connected to each other by a bonding method.

Common source line contact plugs 1380 and 1480 may be disposed in the outer pad bonding area PA. The common source line contact plugs 1380 and 1480 may be formed of a conductive material, such as metal, metal compound, or doped polysilicon. The common source line contact plug 1380 of the first cell area CELL1 may be electrically connected to the common source line 1320, and the common source line contact plug 1480 of the second cell area CELL2 may be electrically connected to the common source line 1420. A first metal wire 1350a and a second metal wire 1360a are sequentially stacked on the upper portion of the common source line contact plug 1380 of the first cell area CELL1, and a first metal wire 1450a and a second metal wire 1460a may be sequentially stacked on the common source line contact plug 1480 of the second cell area CELL2.

Input/output pads 1205, 1405, and 1406 may be disposed in the outer pad bonding area PA. Referring to FIG. 23, a lower insulating layer 1201 may cover a lower surface of the first substrate 1210, and a first input/output pad 1205 may be formed on the lower insulating layer 1201. The first input/output pad 1205 may be connected to at least one of a plurality of circuit elements 1220a disposed in a peripheral circuit area PERI through a first input/output contact plug 1203, and may be separated from the first substrate 1210 by the lower insulating layer 1201. A side insulating layer may be disposed between the first input/output contact plug 1203 and the first substrate 1210 to electrically separate the first input/output contact plug 1203 from the first substrate 1210.

An upper insulating layer 1401 covering an upper surface of the third substrate 1410 may be formed on the third substrate 1410. A second input/output pad 1405 and/or a third input/output pad 1406 may be disposed on the upper insulating layer 1401. The second input/output pad 1405 may be connected to at least one of a plurality of circuit elements 1220a disposed in a peripheral circuit area PERI through the second input/output contact plugs 1403 and 1303, and the third input/output pad 1406 may be connected to at least one of the plurality of circuit elements 1220a disposed in the peripheral circuit area PERI through the third input/output contact plugs 1404 and 1304.

In some example embodiments, the third substrate 1410 may not be disposed in an area where the input/output contact plugs are disposed. For example, as shown in B, the third input/output contact plug 1404 is separated from the third substrate 1410 in a direction parallel to the upper surface of the third substrate 1410, and may pass through the interlayer insulating layer 1415 of the second cell area CELL2 and be connected to the third input/output pad 1406. In this case, the third input/output contact plug 1404 may be formed through various processes.

For example, as shown in B1, the third input/output contact plug 1404 may extend in a third direction (Z-axis direction) and may have a larger diameter toward the upper insulating layer 1401. That is, while the diameter of the channel structure CH described in A1 is formed to decrease toward the upper insulating layer 1401, a diameter of the third input/output contact plug 1404 may be formed to increase toward the upper insulating layer 1401. For example, the third input/output contact plug 1404 may be formed after the second cell area CELL2 and the first cell area CELL1 are coupled by a bonding method.

In some example embodiments, illustratively, as shown in B2, the third input/output contact plug 1404 extends in the third direction (Z-axis direction) and may be formed to have a smaller diameter toward the upper insulating layer 1401. That is, the diameter of the third input/output contact plug 1404 may be formed to decrease toward the upper insulating layer 1401 like the channel structure CH. For example, the third input/output contact plug 1404 may be formed together with the cell contact plugs 1440 before the second cell area CELL2 and the first cell area CELL1 are bonded together.

In some example embodiments, the input/output contact plugs may be disposed to overlap the third substrate 1410. For example, as shown in C, the second input/output contact plug 1403 is formed by penetrating the interlayer insulating layer 1415 of the second cell area CELL2 in the third direction (Z-axis direction), and may be electrically connected to the second input/output pad 1405 through the third substrate 1410. In this case, the connection structure between the second input/output contact plug 1403 and the second input/output pad 1405 may be implemented in various ways.

Illustratively, as shown in C1, an opening 1408 penetrating the third substrate 1410 is formed, and the second input/output contact plug 1403 may be directly connected to the second input/output pad 1405 through the opening 1408 formed in the third substrate 1410. In this case, as shown in C1, the diameter of the second input/output contact plug 1403 may increase toward the second input/output pad 1405. However, this is exemplary, and the diameter of the second input/output contact plug 1403 may be formed to decrease toward the second input/output pad 1405.

For example, as shown in C2, an opening 1408 penetrating the third substrate 1410 may be formed, and a contact 1407 may be formed in the opening 1408. One end of the contact 1407 may be connected to the second input/output pad 1405 and the other end may be connected to the second input/output contact plug 1403. Accordingly, the second input/output contact plug 1403 may be electrically connected to the second input/output pad 1405 through the contact 1407 in the opening 1408. In this case, as shown in C2, the diameter of the contact 1407 may be formed to increase toward the second input/output pad 1405, and the diameter of the second input/output contact plug 1403 may be formed to decrease toward the second input/output pad 1405. For example, the third input/output contact plug 1403 is formed together with the cell contact plugs 1440 before the second cell area CELL2 and the first cell area CELL1 are bonded together, and the contact 1407 may be formed after bonding the second cell area CELL2 and the first cell area CELL1.

In some example embodiments, illustratively, as shown in C3, a stopper 1409 may be further formed on the upper surface of the opening 1408 of the third substrate 1410 compared to C2. The stopper 1409 may be a metal wire formed on the same layer as the common source line 1420. However, this is exemplary, and the stopper 1409 may be a metal wire formed on the same layer as at least one of the word lines 1430. The second input/output contact plug 1403 may be electrically connected to the second input/output pad 1405 through the contact 1407 and the stopper 1409.

Similar to the second and third input/output contact plugs 1403 and 1404 of the second cell area CELL2, the diameters of the second and third input/output contact plugs 1303 and 1304 of the first cell area CELL1 may be formed to decrease toward the lower metal pattern 1371e, or may be formed to increase toward the lower metal pattern 1371e.

According to some example embodiments, a slit 1411 may be formed in the third substrate 1410. For example, the slit 1411 may be formed at an arbitrary position of the outer pad bonding area PA. For example, as shown in D, the slit 1411 may be located between the second input/output pad 1405 and the cell contact plugs 1440 when viewed from a plan view. However, this is exemplary, and the slit 1411 may be formed such that the second input/output pad 405 is positioned between the slit 1411 and the cell contact plugs 1440 when viewed from a plan view.

Illustratively, as shown in D1, the slit 1411 may be formed to pass through the third substrate 1410. The slit 1411 may be used, for example, to prevent the third substrate 1410 from being finely cracked when the opening 1408 is formed. However, this is exemplary, and the slit 1411 may be formed to a depth of about 60 to about 70% of the thickness of the third substrate 1410.

In some example embodiments, as an example, as shown in D2, a conductive material 1412 may be formed in the slit 1411. The conductive material 1412 may be used, for example, to discharge leakage current generated during driving of circuit elements in an outer pad bonding area PA to the outside. In this case, the conductive material 1412 may be connected to an external ground line.

In some example embodiments, as an example, as shown in D3, an insulating material 1413 may be formed in the slit 1411. The insulating material 1413, for example, may be formed to electrically separate the second input/output pad 1405 and the second input/output contact plug 1403 disposed in the outer pad bonding area PA from the word line bonding area WLBA. By forming an insulating material 1413 in the slit 1411, it is possible to block the voltage provided through the second input/output pad 1405 from affecting the metal layer disposed on the third substrate 1410 in the word line bonding area WLBA.

According to some example embodiments, the first to third input/output pads 1205, 1405, and 1406 may be selectively formed. For example, the memory device 1100 may be implemented to include only the first input/output pad 1205 disposed on the first substrate 1201, or include only the second input/output pad 1405 disposed on the third substrate 1410, or include only the third input/output pad 1406 disposed on the upper insulating layer 1401.

According to some example embodiments, at least one of the second substrate 1310 of the first cell area CELL1 and the third substrate 1410 of the second cell area CELL2 may be used as a sacrificial substrate, and may be completely or partially removed before or after the bonding process. Additional films may be deposited after substrate removal. For example, the second substrate 1310 of the first cell area CELL1 may be removed before or after bonding of the peripheral circuit area PERI and the first cell area CELL1, and an insulating layer covering an upper surface of the common source line 1320 or a conductive film for connection may be formed. Similarly, the third substrate 1410 of the second cell area CELL2 may be removed before or after bonding of the first cell area CELL1 and the second cell area CELL2, and an upper insulating layer 1401 covering an upper surface of the common source line 1420 or a conductive film for connection may be formed.

According to some example embodiments, the upper bonding metals 1270c of the peripheral circuit area PERI may be disposed above the page buffer circuit area, and may be arranged in a matrix form along the first direction X and the second direction Y. The page buffer circuit area may correspond to a bit line bonding area BLBA. For example, the upper bonding metals 1270c may be grouped into a plurality of bonding pad groups, and each bonding pad group may include upper bonding metals arranged in a row along the first direction Y. According to some example embodiments, the peripheral circuit area PERI may include a plurality of through wires extending along the first direction Y. For example, each through wire may be disposed between groups of adjacent bonding pads.

While various example embodiments have been particularly shown and described with reference to the drawings herein, it will be understood that various changes in form and details may be made therein without departing from the spirit and scope of the following claims.

What is claimed is:

1. A non-volatile memory device comprising:
   a memory cell array including memory cells coupled to a plurality of word lines;
   a boost circuit configured to receive an external power supply voltage and generate a boosted voltage based on the external power supply voltage;
   a regulator configured to generate a regulated voltage based on the external power supply voltage; and
   a control logic configured to control word line voltages provided to the plurality of word lines,
   wherein the control logic performs a plurality of program loops in a program operation for the memory cell array, and
   wherein the control logic provides an adjacent word line voltage to at least one adjacent word line that is adjacent to a selected word line, and
   wherein, in a first section of the plurality of program loops, the control logic provides the regulated voltage as the adjacent word line voltage, and in a second section of the plurality of program loops, the control logic provides the boosted voltage as the adjacent word line voltage.

2. The non-volatile memory device of claim 1, further comprising a switch that receives the external power supply voltage and the boosted voltage,
   wherein, in the first section, the switch outputs the external power supply voltage to the regulator, and the regulator regulates the external power supply voltage to generate the adjacent word line voltage,
   wherein, in the second section, the switch outputs the boosted voltage to the regulator and the regulator regulates the boosted voltage to generate the adjacent word line voltage.

3. The non-volatile memory device of claim 1, wherein the first section comprises initial program loops of the plurality of program loops, and the second section comprises subsequent remaining program loops of the plurality of program loops.

4. The non-volatile memory device of claim 1, wherein the regulator comprises a first regulator and a second regulator,
   wherein the first regulator provides a first regulating voltage to the at least one adjacent word line as the adjacent word line voltage,
   wherein the second regulator provides a second regulating voltage to non-selected word lines among the plurality of word lines.

5. The non-volatile memory device of claim 1, wherein an incremental step pulse programming (ISPP) voltage of which a level gradually increases as the plurality of program loops are performed is provided to the selected word line;

wherein a level of the adjacent word line voltage rises corresponding to a level rise of the ISPP voltage, wherein the level of the adjacent word line voltage rises at least once in each of the first section and the second section.

6. The non-volatile memory device of claim 5, further comprising a counter configured to count the plurality of program loops, wherein, when a counting value of the counter is greater than or equal to a threshold value, the control logic provides the boosted voltage as the adjacent word line voltage.

7. The non-volatile memory device of claim 1, wherein a level of the adjacent word line voltage increases stepwise at least once in a process of performing the plurality of program loops, wherein the control logic provides the boosted voltage as the adjacent word line voltage to the at least one adjacent word line when the level of the adjacent word line voltage is greater than or equal to a threshold level.

8. The non-volatile memory device of claim 1, wherein the control logic generates an adjustment code for adjusting a target level of the adjacent word line voltage and provides a control signal to switch from the regulated voltage as the adjacent word line voltage to the boosted voltage as the adjacent word line voltage based on the adjustment code.

9. The non-volatile memory device of claim 1, wherein the external power supply voltage has a level between a minimum value and a maximum value of voltages to be provided to the at least one adjacent word line in the plurality of program loops.

10. The non-volatile memory device of claim 1, further comprising a vertical flash memory device, wherein the at least one adjacent word line comprises one or more word lines positioned above the selected word line and one or more word lines positioned below the selected word line.

11. The non-volatile memory device of claim 1, wherein the memory cells are programmed to a plurality of threshold voltage states, wherein, in a read operation or verify operation of the memory cells, the control logic provides the regulated voltage as the adjacent word line voltage in a read operation or verify operation for states having a relatively low threshold voltage level among the plurality of threshold voltage states, and the control logic provides the boosted voltage as the adjacent word line voltage in a read operation or verify operation for states having a relatively high threshold voltage level.

12. A method of operating a non-volatile memory device, in which a program operation of the non-volatile memory device comprises a plurality of program loops, the method comprises:

providing a first boosted voltage generated by boosting an external power supply voltage to a selected word line;

providing a first regulated voltage generated by regulating the external power supply voltage to a non-selected word line;

providing a second regulated voltage generated by regulating the external power supply voltage to at least one adjacent word line that is adjacent to the selected word line in initial loops of the plurality of program loops; and providing a second boosted voltage generated by boosting the external power supply voltage to the at least one adjacent word line in subsequent loops after the initial loops are performed.

13. The method of claim 12, wherein providing the second boosted voltage comprises providing a third regulated voltage generated by regulating the second boosted voltage to the at least one adjacent word line.

14. The method of claim 12, wherein the external power supply voltage has a level between a minimum value and a maximum value of voltages provided to the at least one adjacent word line in the plurality of program loops.

15. The method of claim 12, wherein, while the plurality of program loops are successively executed, a level of a voltage provided to the at least one adjacent word line gradually increases, wherein the initial loops comprise program loops executed when the level of the voltage less than a threshold level, and the subsequent loops comprise program loops executed when the level of the voltage is greater than or equal to the threshold level.

16. The method of claim 12, wherein memory cells are programmed to a plurality of threshold voltage states, wherein the method further comprises:

providing the second regulated voltage to the at least one adjacent word line, during a read operation for states having a relatively low threshold voltage level among the plurality of threshold voltage states; and providing the second boosted voltage to the at least one adjacent word line, during a read operation for states having a relatively high threshold voltage level among the plurality of threshold voltage states.

17. A storage device comprising:

a non-volatile memory having a memory cell array including memory cells connected to a plurality of word lines;

a controller configured to control a memory operation of the non-volatile memory; and a power management integrated circuit (PMIC) configured to provide a high voltage to the non-volatile memory, wherein the non-volatile memory comprises:

a regulator configured to provide a first adjacent word line voltage that is generated by regulating the high voltage to at least one adjacent word line that is adjacent to a selected word line, in initial loops of a plurality of program loops included in a program operation; and a boost circuit configured to provide a second adjacent word line voltage that is generated by boosting the high voltage to the at least one adjacent word line in subsequent loops among the plurality of program loops that are subsequent to the initial loops.

18. The storage device of claim 17, wherein, as a program voltage level provided to the selected word line gradually increases in the plurality of program loops, the regulator provides the first adjacent word line voltage of which a level rises at least once in the initial loops, and the boost circuit provides the second adjacent word line voltage of which a level rises at least once in the subsequent loops.

19. The storage device of claim 18, wherein the boost circuit generates the second adjacent word line voltage by regulating a boosted voltage that is generated by boosting the high voltage.

20. The storage device of claim 18, wherein the PMIC provides the high voltage having a level between a minimum value and a maximum value of voltages to be provided to the at least one adjacent word line in the plurality of program loops.

* * * * *